(12) United States Patent
Ryuzaki et al.

(10) Patent No.: US 6,829,457 B2
(45) Date of Patent: Dec. 7, 2004

(54) DRIVING APPARATUS AND IMAGE FORMATION APPARATUS USING THE DRIVING APPARATUS

(75) Inventors: Takahiko Ryuzaki, Kanagawa (JP); Norio Hokari, Kanagawa (JP); Satoru Nishikawa, Kanagawa (JP); Susumu Kibayashi, Kanagawa (JP); Yoshihiko Mitamura, Kanagawa (JP); Tokuaki Hanzawa, Kanagawa (JP); Michiaki Yoshihara, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/282,123

(22) Filed: Oct. 29, 2002

(65) Prior Publication Data

US 2003/0113133 A1 Jun. 19, 2003

(30) Foreign Application Priority Data

Dec. 14, 2001 (JP) .................................... P. 2001-381884
Aug. 28, 2002 (JP) .................................... P. 2002-248548

(51) Int. Cl.⁷ .......................... G03G 15/00; F16H 33/00
(52) U.S. Cl. ............................ 399/167; 74/640; 74/665
(58) Field of Search ................................ 399/159, 162, 399/165, 167; 74/384, 640, 665 L, 405, 409, 440, 462; 475/331, 344

(56) References Cited

U.S. PATENT DOCUMENTS 3,919,894 A * 11/1975 Keeter et al. .................. 74/384
5,964,150 A * 10/1999 Kato et al. .................. 101/216
6,137,962 A * 10/2000 Namai ........................ 396/401

FOREIGN PATENT DOCUMENTS

JP 61-156158 7/1986
JP 9-43932 2/1997
JP 3013779 B2 12/1999

* cited by examiner

*Primary Examiner*—Hoan Tran
(74) *Attorney, Agent, or Firm*—Morgan, Lewis & Bockius LLP

(57) ABSTRACT

A driving apparatus transmits a driving force from a drive source to a driven body via a multiple-stage gear train (including, for example, gears). In the multiple-stage gear train, the speed fluctuation phase of a mesh frequency occurring at each mesh point of the gear train including the gears to a target gear is set in a range in which the speed fluctuation amplitude of the target gear positioned downstream at the third stage or later is equal to or less than the speed fluctuation amplitude of the immediately preceding mesh gear positioned upstream. The invention also applies to an image formation apparatus using the drive as a drive of a driven body.

20 Claims, 41 Drawing Sheets

FIG.3(b)
FIG.3(a)
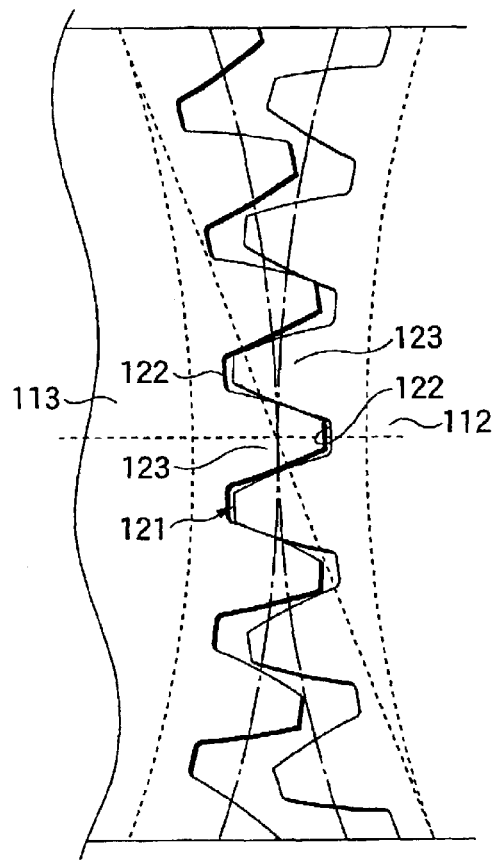
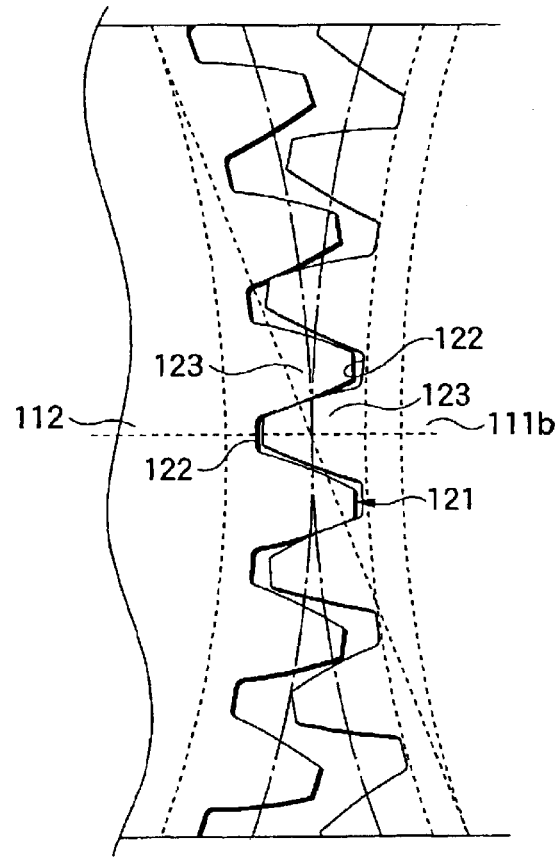

THIRD AXIS    SECOND AXIS    FIRST AXIS

FIG.26(a)
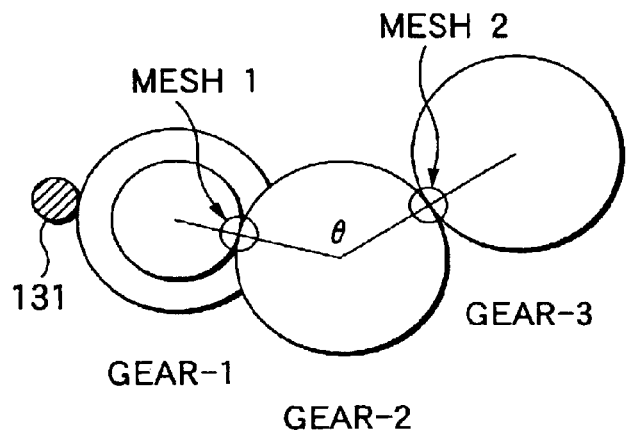
FIG.26(b)
FREQUENCY    1Hz
|        | AMPLITUDE α | PHASE β |
|--------|-------------|---------|
| GEAR-1 | 0.2         | 0       |
| GEAR-2 | 0.3         | 0       |
| GEAR-3 | 0.1         | 0       |
| ADDITION COMPONENT | AMPLITUDE α | PHASE β |
|--------------------|-------------|---------|
| MESH 1             | 0.1         | 0       |
| MESH 2             | 0.2         | 180     |
FIG.26(c)
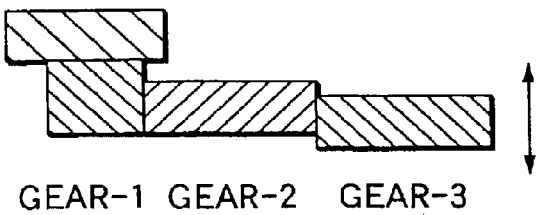
GEAR-1  GEAR-2  GEAR-3

| FREQUENCY | 1Hz | |
|---|---|---|
| | AMPLITUDE $\alpha$ | PHASE $\beta$ |
| GEAR-1 | 0.2 | 0 |
| GEAR-2 | 0.3 | 0 |
| GEAR-3 | 0.5 | 0 |

| ADDITION COMPONENT | AMPLITUDE $\alpha$ | PHASE $\beta$ |
|---|---|---|
| MESH 1 | 0.1 | 0 |
| MESH 2 | 0.2 | 0 |

| FREQUENCY | 1Hz | |
|---|---|---|
| | AMPLITUDE α | PHASE β |
| GEAR-1 | 0.2 | 0 |
| GEAR-2 | 0.3 | 0 |
| GEAR-3 | 0.1 | 0 |

| ADDITION COMPONENT | AMPLITUDE α | PHASE β |
|---|---|---|
| MESH 1 | 0.1 | 0 |
| MESH 2 | 0.2 | 180 |

FIG.33(a) MODEL 1 (MESH PHASE: CREST/TROUGH/TROUGH) SPECIFICATION GEAR MQ MEASUREMENT RESULT VECTOR DIAGRAM
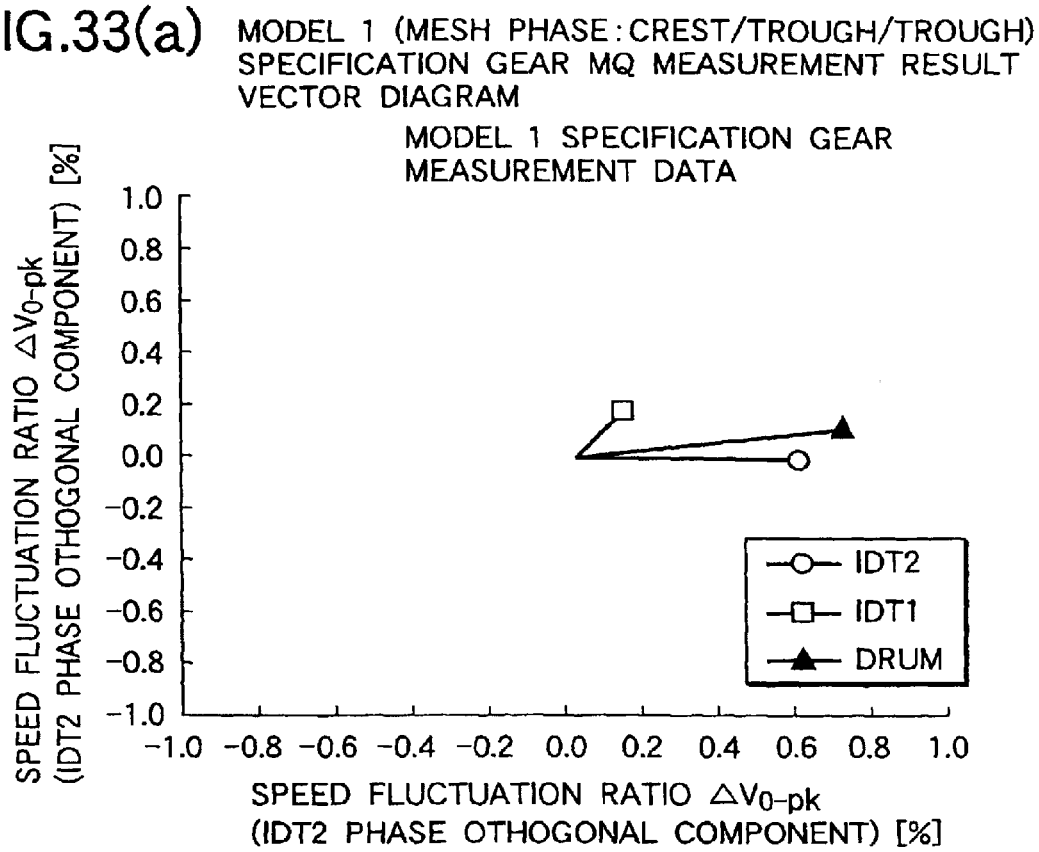
FIG.33(b)
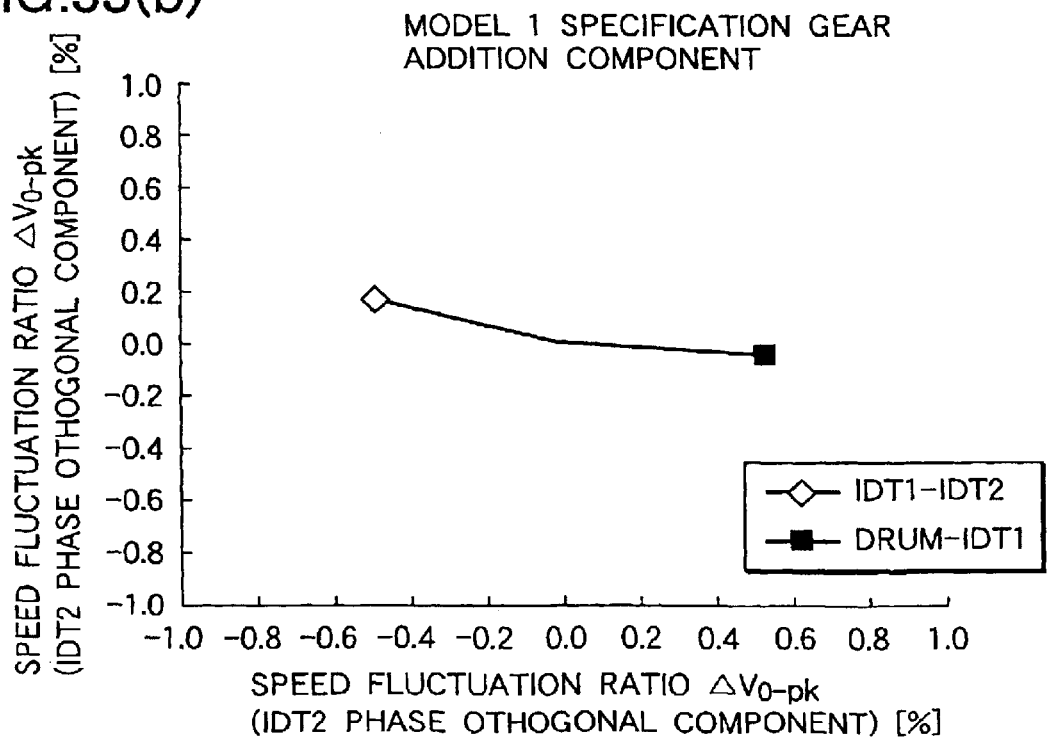

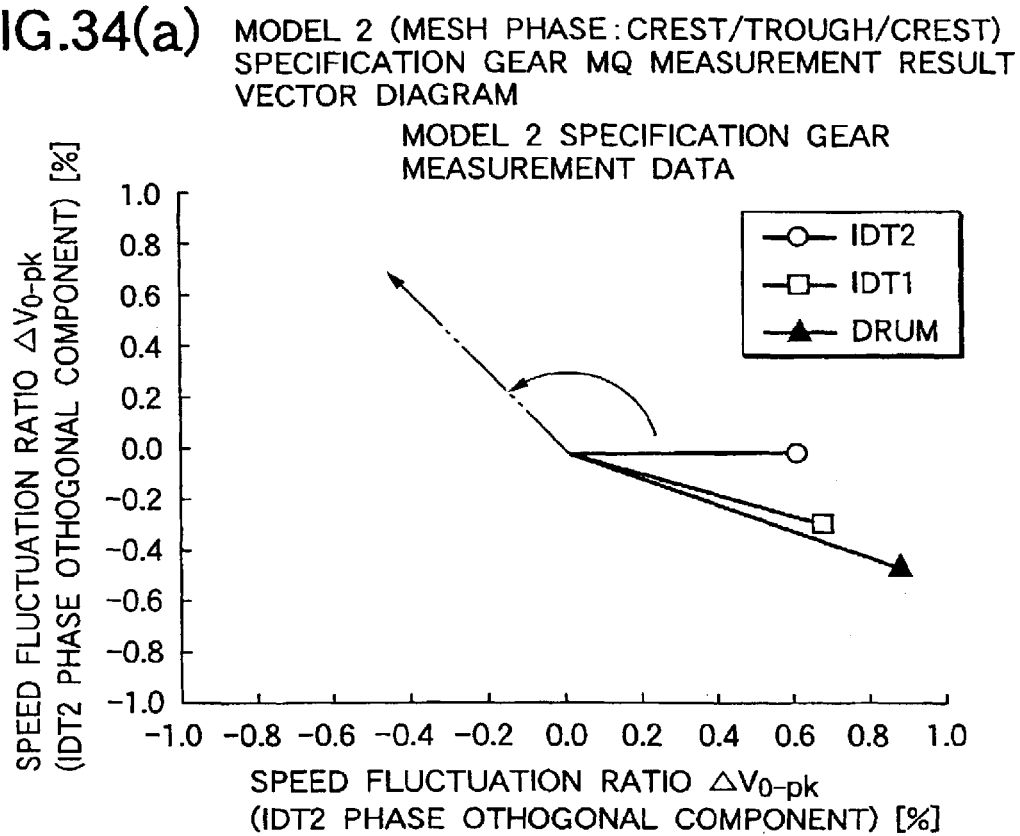
FIG.34(a) MODEL 2 (MESH PHASE: CREST/TROUGH/CREST) SPECIFICATION GEAR MQ MEASUREMENT RESULT VECTOR DIAGRAM
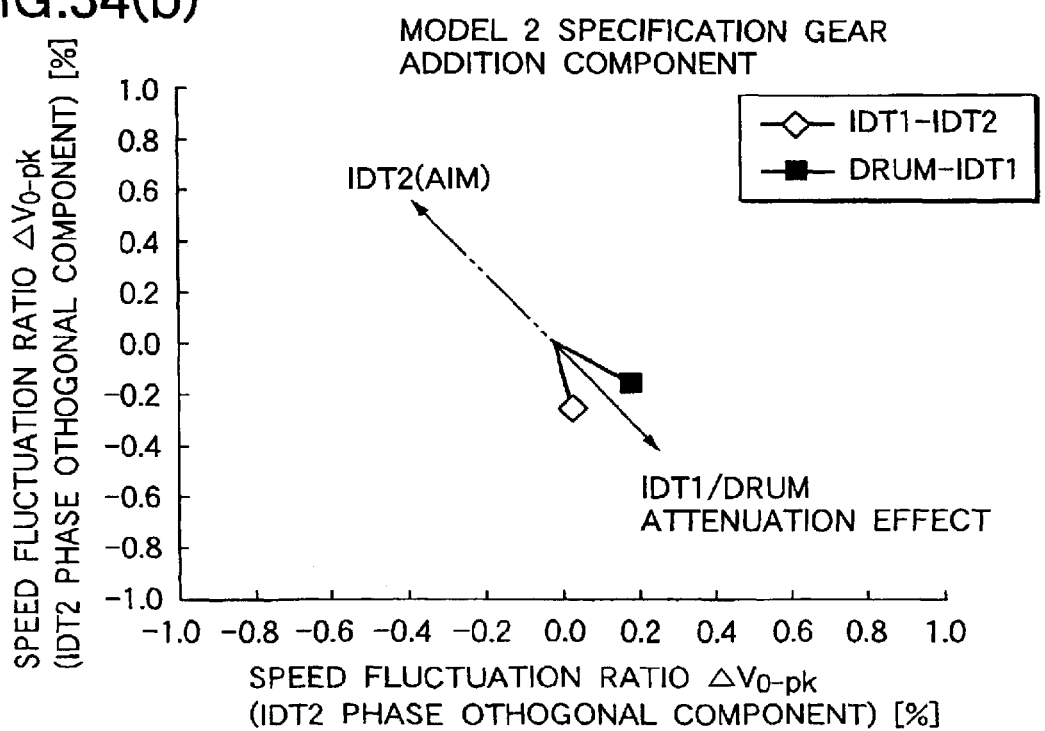
FIG.34(b)

DRIVING APPARATUS AND IMAGE FORMATION APPARATUS USING THE DRIVING APPARATUS

The present disclosure relates to the subject matter contained in Japanese Patent Application No.2001-381884 filed on Dec. 14, 2001 and Japanese Patent Application No.2002-248548 filed on Aug. 28, 2002, which are incorporated herein by reference in its entirety.

BACKGROUND OF THE INVENTION

1. Field of the Invention

This invention relates to a driving apparatus used with an image formation apparatus, such as a copier or a printer, and in particular to improvements in a driving apparatus for transmitting a driving force from a drive source to a driven body via a multiple-stage gear train and an image formation apparatus using the driving apparatus.

2. Description of the Related Art

Generally, as a technique of driving a driven body such as a photoconductor drum or an intermediate transfer body in an image formation apparatus such as a copier or a printer, a driving apparatus for transmitting a driving force from a drive source such as a motor to a driven body with a multiple-stage gear train (a gear train comprising a plurality of gears meshing with each other successively) is used (for example, refer to JP-A-61-156158).

At this time, the vibration component caused by the gears meshing with each other, a one-revolution component caused by eccentricity of a rotor of the motor, and the like enter the frequencies in the functional area of a human being and thus it is necessary to attenuate the components, etc., for providing stable rotation.

Hitherto, as a remedy, it has been generally known to attach a flywheel onto a driven body shaft of a photoconductor drum, etc., for increasing the inertia amount.

An art of attaching a flywheel of a small inertia body to a separate shaft from a driven body shaft of a photoconductor drum, etc., and increasing the speed of the flywheel, thereby giving a large inertia effect to the driven body is also known (for example, refer to Japanese Patent No. 3013779).

However, in this kind of flywheel technique, the number of parts is increased and the apparatus itself is upsized because of use of at least the flywheel as an inertia body. Thus, for example, to apply a driving apparatus of a multiple-stage gear train to a tandem image formation apparatus, etc., it is extremely difficult to apply the flywheel technique from the viewpoints of miniaturizing and making cheaper the image formation apparatus.

Hitherto, as a technique of decreasing speed fluctuation caused by a gear eccentricity component, a related art is proposed wherein the gears of a gear train are formed as gears of the same shape, for example, the same molded articles or integrally simultaneously worked molded articles and at the assembling time of the correspondence positions of the gears, the gears are selectively placed at the phase positions responsive to the speed fluctuation phases of gear shafts (for example, refer to JP-A-61-156158).

From V=r ω (where V: Speed, r: Gear radius, and ω: Angular speed), gears are rotated so that the radiuses of the gears are made the same at the mesh points of the driving apparatus and driven gears, whereby the angular speeds of the driving apparatus and driven gears are made the same for decreasing the eccentricity component of each gear.

However, this type may cope with speed fluctuation caused by the eccentricity component of each gear, but still cannot cope with speed fluctuation caused by the mesh component of each gear.

A technique is disclosed wherein, for example, in a four-cycle intermediate transfer type image formation apparatus, (1) a configuration in which the rotation period of a photoconductor drum drive gear is roughly matched with the rotation period from light exposure to primary transfer and (2) a configuration in which the rotation period of an intermediate transfer body drive gear is roughly matched with the rotation period from primary transfer to secondary transfer are adopted, thereby preventing expansion or contraction of an image caused by the difference between the peripheral speed at an image write position onto a photoconductor drum and that at a transfer position and further preventing expansion or contraction of an image caused by the difference between the speed at the transfer time from the photoconductor drum and that at the transfer time to a record material (for example, refer to JP-A-9-43932).

In this technique, it may be possible to roughly cancel fluctuation (color shift) of the one-revolution period of the photoconductor drum and an intermediate transfer body, caused by the eccentricity of the gears for driving the photoconductor drum and the intermediate transfer body, but an image defect (banding) caused by expansion or contraction of an image caused by the speed fluctuation of gear mesh frequency is not remedied at all; this is a technical problem.

SUMMARY OF THE INVENTION

It is therefore an object of the invention to provide a driving apparatus for making it possible to effectively prevent speed fluctuation caused by the mesh components of a multiple-stage gear train without upsizing the driving apparatus itself and an image accumulation apparatus using the driving apparatus.

The inventor et al. analyzed the mesh state of a gear pair of a multiple-stage gear train model and recognized that the mesh state of gear teeth of a G1 and G2 gear pair changed from moment to moment and the number of mesh points h became two or one and that speed fluctuation was caused by the mesh components of the multiple-stage gear train based on such a behavior, as shown in FIGS. 37(a) to 37(c) and FIGS. 38(a) and (b).

When the mesh state of the gear teeth at each mesh point of the G1 and G2 gear pair was changed in the multiple-stage gear train model, for example, with a crest crest mesh transmission technique (transmission technique in which when the gear tooth at the input side mesh point of the gear G1 is a crest position, the gear tooth at the output side mesh point of the gear G1, namely, at the mesh point with the gear G2 is a crest position), the results of the speed fluctuations of the gears G1 and G2 and the difference between the speed fluctuations were obtained as shown in FIG. 39.

On the other hand, with a crest trough mesh transmission technique (transmission technique in which when the gear tooth at the input side mesh point of the gear G1 is a crest position, the gear tooth at the output side mesh point of the gear G1, namely, at the mesh point with the gear G2 is a trough position), the results of the speed fluctuations of the gears G1 and G2 and the difference between the speed fluctuations were obtained as shown in FIG. 40.

When the speed fluctuation difference between the gears G1 and G2 in the crest crest mesh transmission technique was compared with that in the crest trough mesh transmission technique, the result shown in FIG. 41 was obtained and a clear difference was observed between the speed fluctuation difference waveforms.

Then, the inventor et al. obtained the knowledge that the gear speed fluctuation might be able to be controlled by changing the mesh state at each mesh point of the multiple-stage gear train, and have thought out the invention.

That is, as shown in FIG. 1, according to the invention, there is provided a driving apparatus for transmitting a driving force from a drive source 1 to a driven body (not shown) via a multiple-stage gear train 2 (consisting of, for example, gears 2a to 2c), characterized in that in the multiple-stage gear train 2, the speed fluctuation phase of a mesh frequency occurring at each mesh point of the gear train consisting of the gears 2a to 2c to a target gear 2c is set in the range in which the speed fluctuation amplitude of the target gear 2c positioned downstream at the third stage or later is equal to or less than the speed fluctuation amplitude of the immediately preceding mesh gear 2b positioned upstream.

In such technical means, the multiple-stage gear train 2 refers to the form of a train of a large number of gears meshing with each other. Each of the gears 2a to 2c making up the multiple-stage gear train 2 may be a one-step gear or a multiple-step gear.

Preferably, if at least one of the gears of the multiple-stage gear train 2, for example, the gear 2a is implemented as a multiple-step gear (in the example, two-step gear), the number of the gear stages of the gear train can be decreased because of use of the multiple-step gear.

In FIG. 1, the multiple-stage gear train 2 is made up of the three gears 2a to 2c meshing with a drive shaft gear 1a of the drive source 1, but the invention is not limited to it. Various forms such as a multiple-stage gear train made up of a different number of gear stages and a multiple-stage gear train with a gear stage branching at an intermediate point.

The number of the driven bodies need not be one and may be two or more.

Further, the target gear 2c is not limited to the last stage gear and an intermediate stage gear is also contained. Usually, the driven body is directly joined to the target gear 2c, but a target gear to which the driven body is not directly joined is also contained.

Further, the target gear 2c positioned downstream at the third stage or later assumes the case where there are two or more mesh points to the target gear 2c.

The number of the target gears 2c may be one or may be two or more.

The form in which the number of the target gears 2c is two or more may be the form in which the numbers of gear stages of the multiple-stage gear train 2 from the drive source 1 are different or the same.

If the speed fluctuation amplitude of the target gear 2c is in the range equal to or less than the speed fluctuation amplitude of the immediately preceding mesh gear 2b positioned upstream, the speed fluctuation phase of the mesh frequency at each of mesh points A and B (in FIG. 1, the number of mesh points is two, but is not limited to two, of course) may be adjusted appropriately.

Particularly, most preferably, the range equal to or less than the speed fluctuation amplitude of the immediately preceding mesh gear 2b is set so that the speed fluctuation amplitude of the target gear 2c reaches the minimum.

As a specific setting method of the speed fluctuation phase of the mesh frequency occurring at each of the mesh points A and B of the gear train of the gears 2a to 2c to the target gear 2c, the speed fluctuation phase of the mesh frequency may be set in response to the one-pitch angle of each of the gears 2a to 2c and the position between the mesh points of the gear train.

In the form wherein all or some of the gears 2a to 2c of the multiple-stage gear train including the target gear 2c are helical gears, the speed fluctuation phase of the mesh frequency occurring at each of the mesh points A and B of the gears 2a to 2c of the multiple-stage gear train to the target gear 2c may be set based on the axial mesh width of the helical gear at the helical gear mesh point.

This is intended for setting the gear tooth phase paying attention to the form of the helical gear (the gear tooth phase changes with the axial mesh width).

Particularly, preferably, if the face-width of an intermediate helical gear at an intermediate position in the multiple-stage gear train 2 is set smaller than the face-width of each of helical gears positioned above and below the intermediate helical gear and the intermediate helical gear is meshed with the up and down helical gears in all area of the face-width of the intermediate helical gear, the situation in which the speed fluctuation phase of the mesh frequency varies with the variation in the axial position of the helical gear is circumvented.

If a helical gear positioned at an end part of the multiple-stage gear train is formed as a phase adjustment gear movable in an axial direction, it is made possible to appropriately adjust the speed fluctuation phase of the mesh frequency occurring at each of the mesh points A and B, and it is made possible to finely adjust the speed fluctuation phase.

Further, in the form wherein all or some of the gears 2a to 2c of the multiple-stage gear train including the target gear 2c are helical gears, preferably a position regulation member for regulating an axial position of a helical gear is provided.

Because of the configuration of the helical gear, thrust easily occurs and if looseness is contained in the axial direction of the helical gear, there is a possibility that the speed fluctuation phase of the mesh frequency may change, causing speed fluctuation of the target gear 2c to occur.

However, according to the form, the position of the helical gear is regulated by the position regulation member, so that fluctuation of the speed fluctuation phase of the mesh frequency is suppressed.

A position regulation member shaped like a block, a bush, etc., may be selected appropriately if it regulates at least the axial position of the helical gear; it may regulate a position other than the axial position (for example, a direction orthogonal to the axial direction).

Further, the thrust of the helical gear itself may be used to provide the press force against the position regulation member of the helical gear in addition to providing the press force by a separate member.

In the invention, in the multiple-stage gear train 2, the target gear 2c may be driven at the same speed or with deceleration relative to the upstream mesh gear 2b or the target gear 2c may be driven at increased speed relative to the upstream mesh gear 2b. The adjustment method of the speed fluctuation phase of the mesh frequency varies depending on which mode is adopted.

For example, as a measure not to amplify the speed fluctuation amplitude of the target gear 2c in the same speed or deceleration mode, in the form wherein the driving apparatus comprises an at least two-stage gear train of gears 2a and 2b upstream from the target gear 2c, of three-stage gear train consisting of the target gear 2c and the upstream two-stage gear train of the gears 2a and 2b, the phases of gear teeth at an output side mesh point B of the intermediate gear 2b and an input side mesh point A of the intermediate gear 2b may be shifted to roughly opposite phases.

However, the phase shift amount may be in a range in which the speed fluctuation amplitude of the target gear 2c is not amplified, and thus the phases need not precisely be opposite phases and a predetermined allowed width exists for the opposite phase; in this point, roughly opposite phases are adopted.

In the form wherein the driving apparatus comprises an at least two- or-more-stage gear train of gears 2a, 2b . . . upstream from the target gear 2c, the phases of gear teeth at mesh points A, B . . . of the gear train consisting of the target gear 2c and the upstream two-or-more-stage gear train of gears 2a, 2b . . . contiguous with the target gear 2c may be shifted in response to the shift angle provided by dividing 360 degrees by the number of mesh points.

This means that if the gear train is an n-stage gear train, the number of mesh points is n−1 and thus the phases are shifted at the shift angle of 360°/(n−1).

In this case, the gear tooth phase difference may be canceled at the mesh point of the target gear 2c.

As a measure not to amplify the speed fluctuation amplitude of the target gear 2c in a speed increasing mode, in the form wherein the driving apparatus comprises an at least two-stage gear train of gears 2a and 2b upstream from the target gear 2c, of three-stage gear train consisting of the target gear 2c and the upstream two-stage gear train of the gears 2a and 2b, the phases of gear teeth at an output side mesh point B of the intermediate gear 2b and an input side mesh point A of the intermediate gear 2b may be set roughly to the same phases.

However, the phase shift amount maybe in a range in which the speed fluctuation amplitude of the target gear 2c is not amplified, and thus the phases need not precisely be the same phases and a predetermined allowed width exists for the same phase; in this point, roughly same phases are adopted.

Thus, the speed increasing mode and the same speed or deceleration mode differ in gear tooth behavior at the mesh point (it is estimated that such a phenomenon depends on the difference between the slip ratios at the mesh start and end of gear teeth) and thus the adjustment method of the speed fluctuation phase differs.

In the mesh frequency of the multiple-stage gear train, harmonic components of double wave, triple wave, etc., may occur in addition to the fundamental component.

Therefore, "setting the speed fluctuation phase of the mesh frequency" includes not only setting centering around the fundamental component, but also setting centering around the harmonic component.

For example, if the harmonic component of a mesh frequency mainly occurs in a driving apparatus including a multiple-stage gear train, the speed fluctuation phase of the mesh frequency may be set so as to cancel out the speed fluctuation of the harmonic component.

As the means for canceling out the speed fluctuation phase of the harmonic component, for example, if the mesh frequency is changed because of double gear, etc., at an intermediate point of the multiple-stage gear train, setting the changed mesh frequency to an integral multiple of the former mesh frequency or the like can be named.

The invention applies not only to the driving apparatus, but also to an image formation apparatus using the driving apparatus.

In this case, the driving apparatus may be used as a driving apparatus of a driven body such as an image support.

As a specific application example to the image formation apparatus, taking an intermediate transfer type as an example, the image formation apparatus can comprise an image formation support for forming and supporting an image and an intermediate transfer body for temporarily supporting the image on the image formation support, transporting the image, and transferring the image onto a record material and using a driving apparatus for transmitting a driving force from one drive source to the intermediate transfer body and the image formation support in order.

BRIEF DESCRIPTION OF THE DRAWINGS

In the accompanying drawings:

FIG. 3(a) is a detailed drawing of mesh point A in FIG. 2 and FIG. 3(b) is a detailed drawing of mesh point B in FIG. 2;

FIG. 26(a) is a schematic representation to show an outline of a driving apparatus according to a second example, FIG. 26(b) is a schematic representation to show amplitude α and phase β of each of gears G1 to G3 and amplitude α and phase β of addition component at mesh 1, 2 in the second example, and FIG. 26(c) is a schematic representation to show the mesh relationship among the gears G1 to G3;

FIG. 33(a) is an MQ measurement result vector diagram of each part of a model 1 specification gear in a fourth example and FIG. 33(b) is a schematic representation to show the difference;

FIG. 34(a) is an MQ measurement result vector diagram of each part of a model 2 specification gear in a fourth example and FIG. 34(b) is a schematic representation to show the difference;

DETAILED DESCRIPTION OF THE PREFERRED EMBODIMENTS

Figure 1:
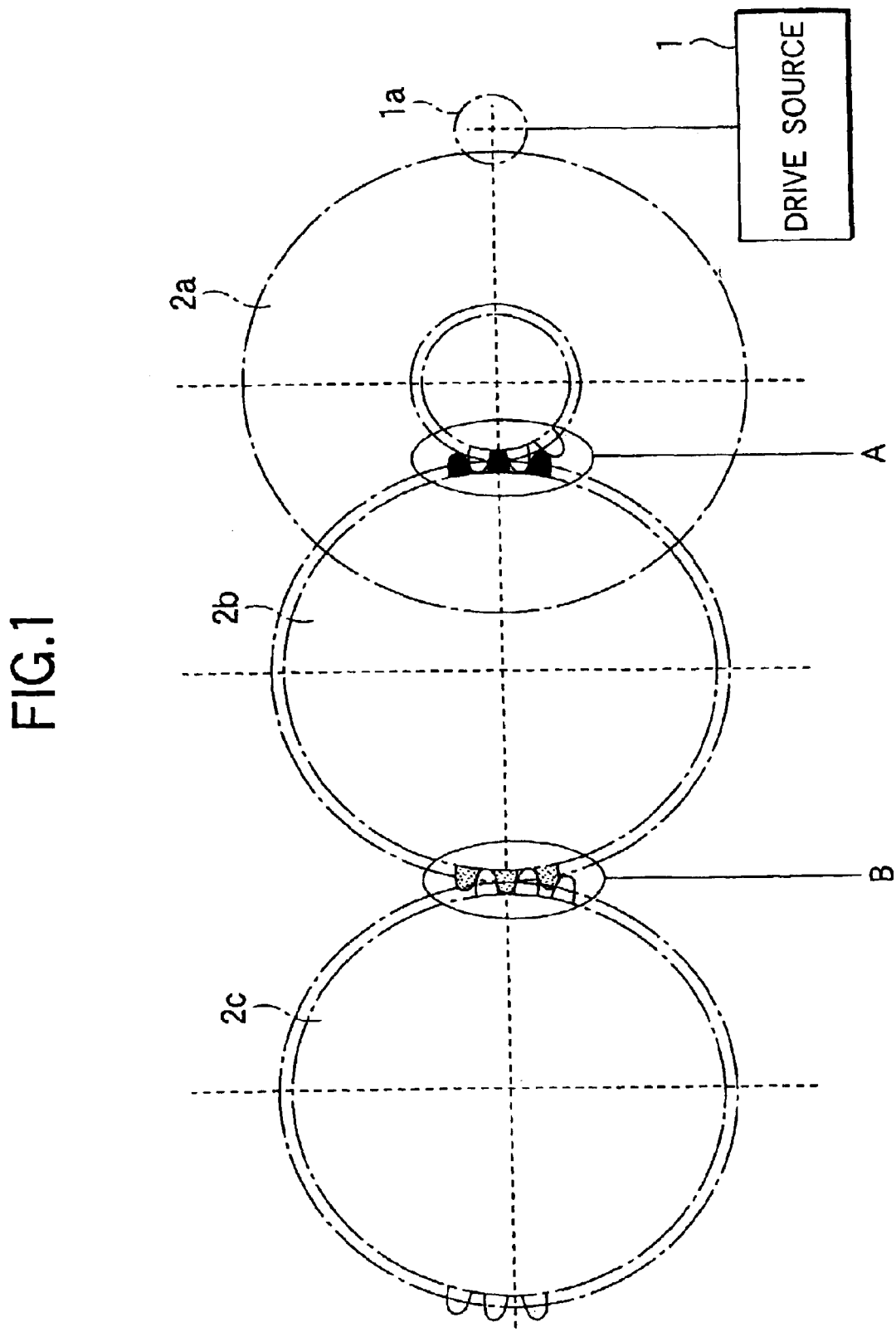
FIG. 1 is a schematic representation to show an outline of a driving apparatus according to the invention.
Figure 2:
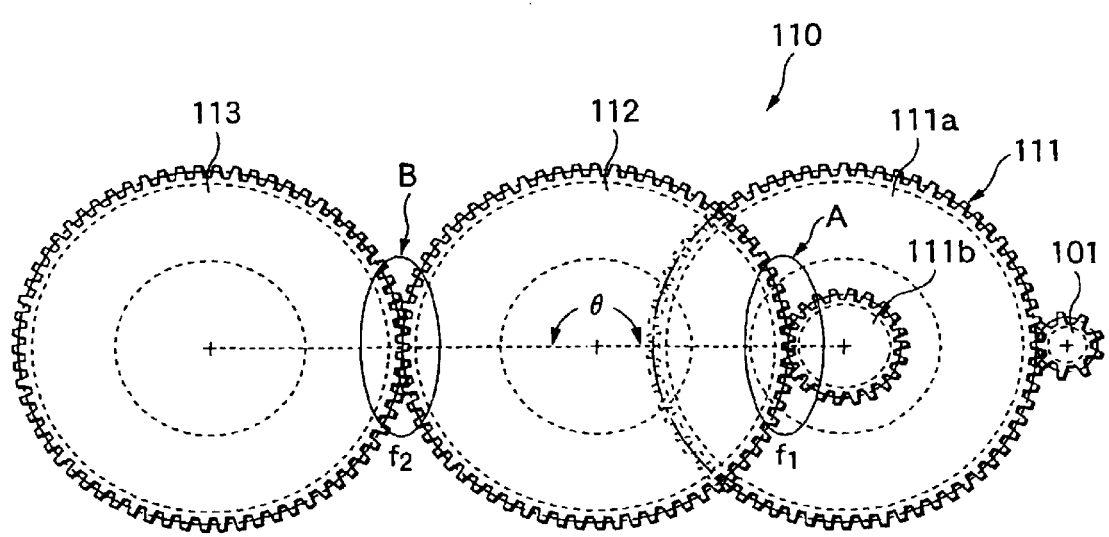
FIG. 2 is a schematic representation to show an outline of a first embodiment of a driving apparatus according to the invention.

Referring now to the accompanying drawings, preferred embodiments of the invention will be described in detail.
First Embodiment:

FIG. 2 shows a driving apparatus according to a first embodiment to which the invention is applied.

In the figure, a driving apparatus 100 has a first gear 111 for meshing with a drive gear (motor shaft gear) 101 toothed in a motor shaft of a drive source, a second gear 112 for meshing with the first gear 111, and a third gear 113 for meshing with the second gear 112, the third gear 113 being joined to a driven body (not shown).

In the embodiment, the first gear 111 has double gears of a large-diameter gear 111a and a small-diameter gear 111b fixed coaxially with the large-diameter gear 111a; the drive gear 101 meshes with the large-diameter gear 111a and the second gear 112 having a larger diameter than that of the small-diameter gear 111b meshes with the small-diameter gear 111b.

In the embodiment, the second gear 112 and the third gear 113 are implemented as the same standardized articles, for example, and the third gear 113 is driven with deceleration.

Particularly, in the embodiment, the following relationship holds: If a crest 123 (trough 122) of a gear tooth 121 of the small-diameter gear 111b meshes with a trough 122 (crest 123) of a gear tooth 121 of the second gear 112, as shown in FIGS. 2 and 3(a), at input mesh point A of the second gear 112 (mesh point between the second gear 112 and the small-diameter gear 111b of the first gear 111), a trough 122 (crest 123) of a gear tooth 121 of the second gear 112 meshes with a crest 123 (trough 122) of a gear tooth 121 of the third gear 113, as shown in FIGS. 2 and 3(b), at output mesh point B of the second gear 112 (mesh point between the second gear 112 and the third gear 113).

Figure 6:
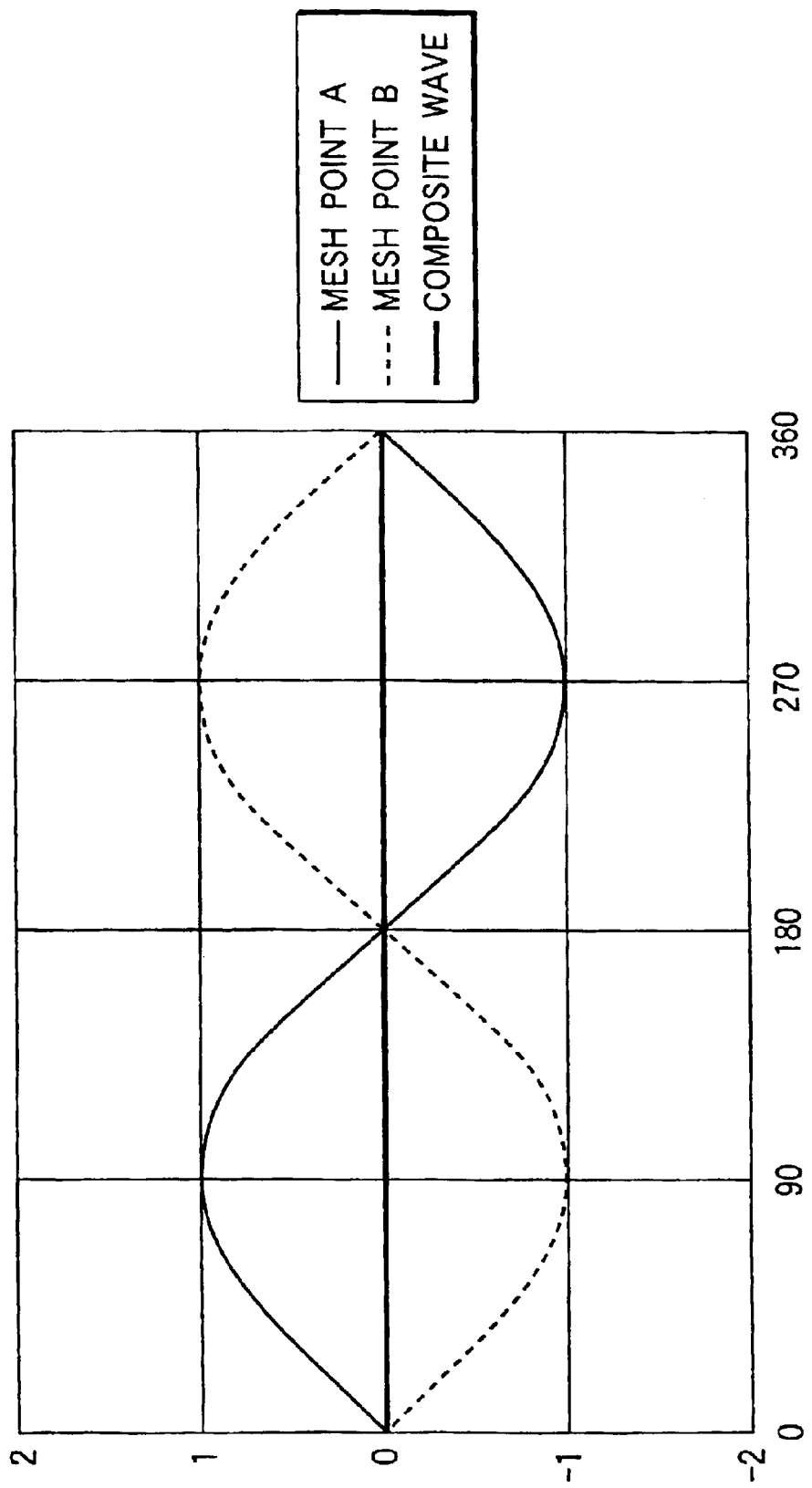
FIG. 6 is a schematic representation to show speed fluctuation phase change at mesh points A and B and composite wave in the first embodiment of the invention.

That is, in the embodiment, the mesh phase of the gear tooth 121 at the mesh point B is the opposite phase (180° shift) to the mesh phase of the gear tooth 121 at the mesh point A as shown in FIG. 6 (so-called crest trough mesh transmission technique).

In the example, assuming that the number of teeth of the second gear 112, the third gear 113 is m (for example, even number), the number of teeth from mesh point A to mesh point B is (m/2) and angle between the mesh points, θ, is set corresponding to the number of teeth.

Figure 4:
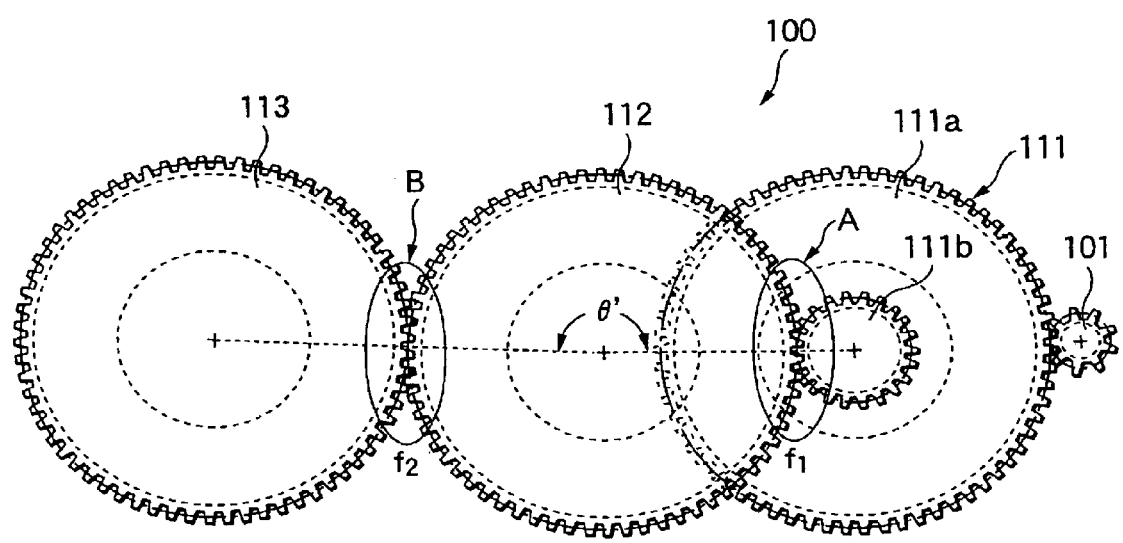
FIG. 4 is a schematic representation to show an outline of a driving apparatus according to a comparative embodiment.

FIG. 4 shows a driving apparatus according to a comparative embodiment.

Figure 5B:
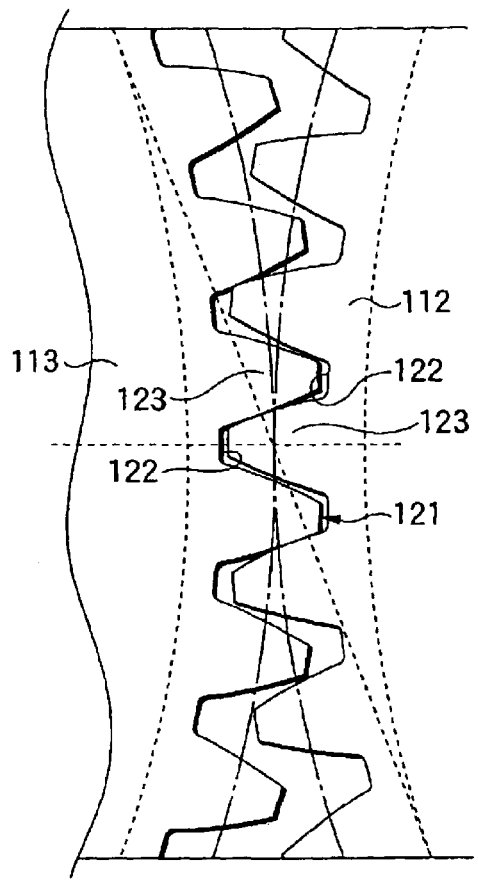
FIG. 5(b) is a detailed drawing of mesh point B in FIG. 4.
Figure 5A:
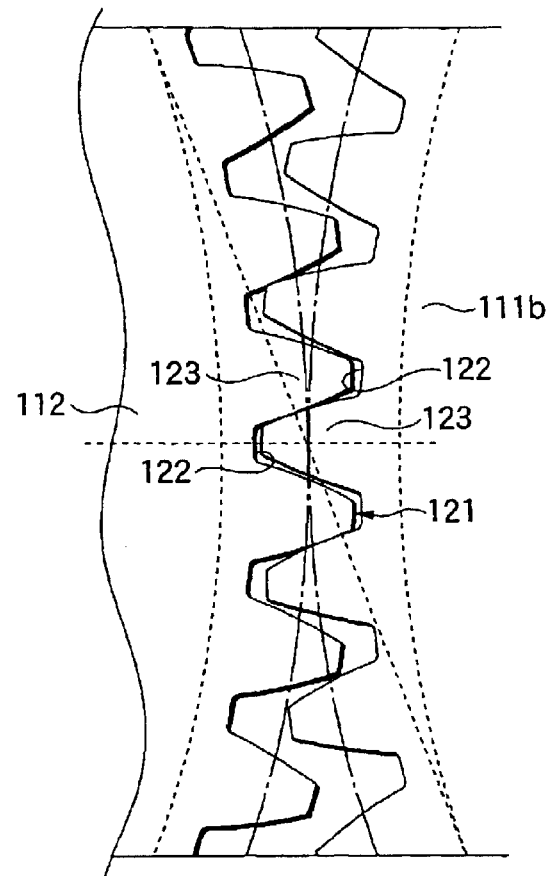
FIG. 5(a) is a detailed drawing of mesh point A in FIG. 4

In the figure, the driving apparatus has a basic configuration roughly similar to that of the driving apparatus of the first embodiment; as shown in FIGS. 4 and 5(a) and 5(b), a gear tooth 121 at mesh point B has the same phase as a gear tooth 121 at mesh point A (so-called crest crest mesh transmission technique).

Angle between the mesh points, θ', is set corresponding to a predetermined number of teeth (for example, (m/2)-(½)).

Therefore, according to the first embodiment, in the multiple-stage gear train having the gears 111 to 113, mesh frequency at the mesh point A between the first gear 111 and the second gear 112 (in the example, the fundamental component is considered), $f_1$, and mesh frequency at the mesh point B between the second gear 112 and the third gear 113 (in the example, the fundamental component is considered), $f_2$, become vibration of the same frequency.

Figure 7A:
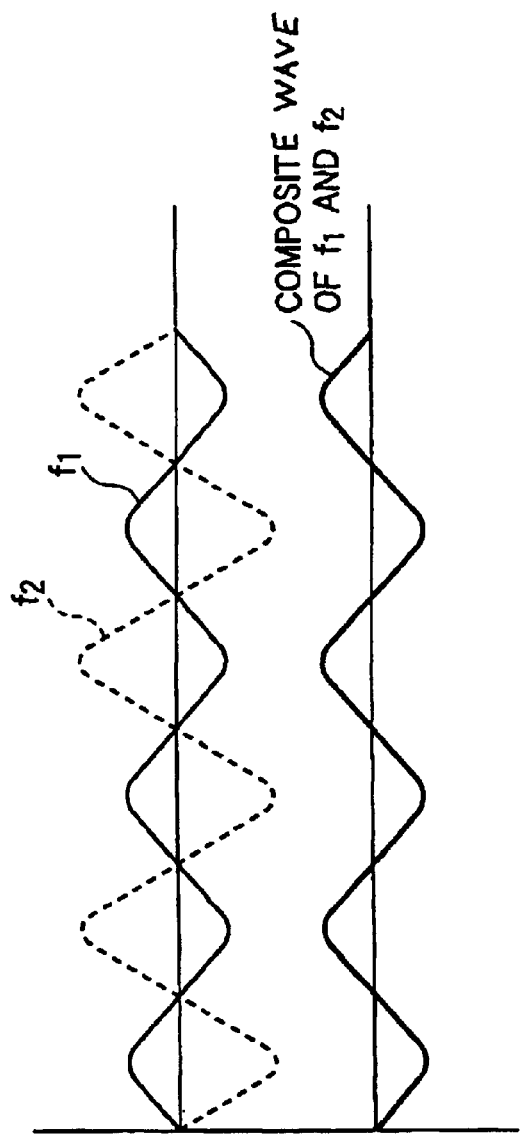
FIG. 7(a) is, a graph to show mesh frequencies at mesh points A and B and composite wave in the first embodiment of the invention

At this time, in the embodiment, when considering the second gear 112 as a center, the mesh phase of the gear tooth 121 at the output mesh point B becomes the opposite phase to the mesh phase of the gear tooth 121 at the input mesh point A, so that, as shown in FIG. 7(a), the mesh frequencies $f_1$ and $f_2$ cancel each other out and their composite wave is not amplified relative to the mesh vibration of the mesh frequency $f_1$ and is transmitted downstream.

Figure 8:
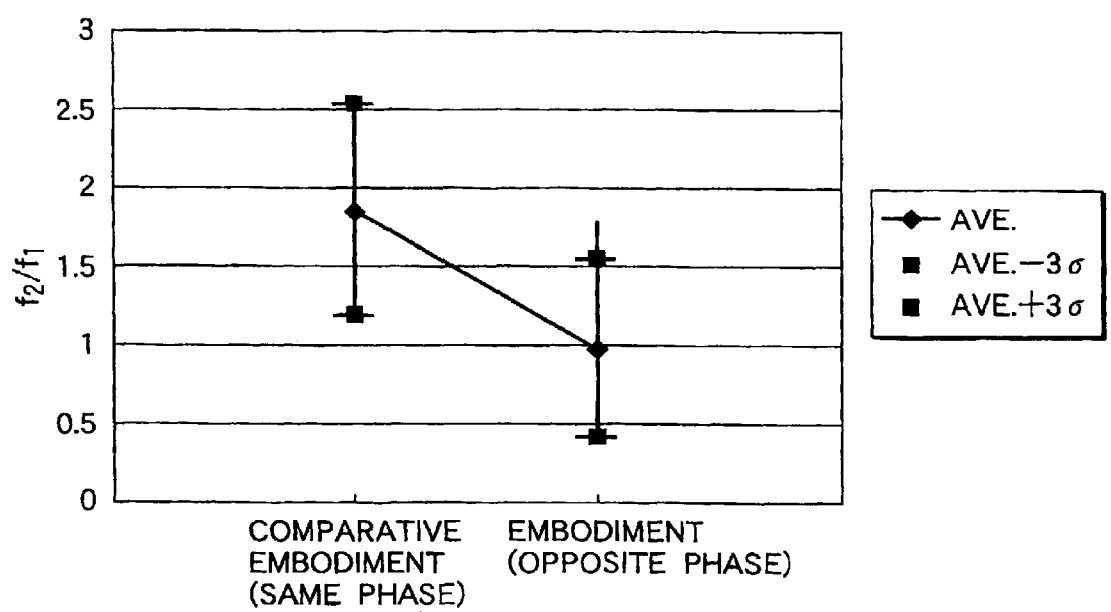
FIG. 8 is a schematic representation to show mesh frequency ratio ($f_2/f_1$) at mesh points A and B in the first embodiment of the invention and mesh frequency ratio ($f_2/f_1$) at mesh points A and B in the comparative embodiment.

Thus, in the embodiment, the mesh frequency ratio ($f_2/f_1$) is suppressed to a small ratio as shown in FIG. 8 and consequently the speed fluctuation amplitude of the third gear 113 is set equal to or less than the speed fluctuation amplitude of the second gear 112. In FIG. 8, σ denotes standard deviation of ($f_2/f_1$).

Figure 7B:
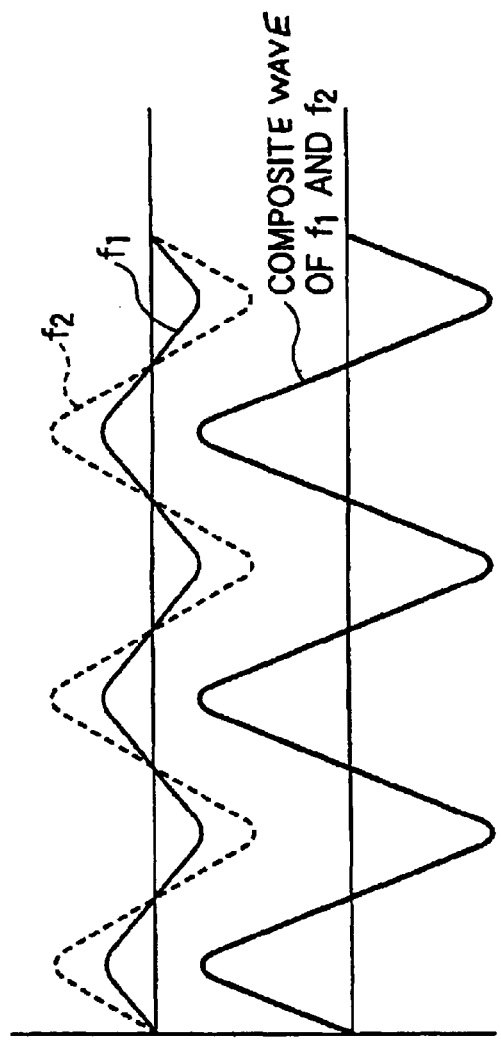
FIG. 7(b) is a graph to show mesh frequencies at mesh points A and B and composite wave in the comparative embodiment.

In contrast, in the comparative embodiment shown in FIG. 4, when considering the second gear 112 as a center, the mesh phase of the gear tooth 121 at the output mesh point B becomes the same phase as the mesh phase of the gear tooth 121 at the input mesh point A, so that, as shown in FIG. 7(b), the mesh frequencies $f_1$ and $f_2$ become the same phase and their composite wave is amplified relative to the mesh vibration of the mesh frequency $f_1$ and is transmitted downstream.

Thus, in the comparative embodiment, the mesh frequency ratio ($f_2/f_1$) becomes large as compared with that in the first embodiment as shown in FIG. 8 and consequently the speed fluctuation amplitude of the third gear 113 is amplified as compared with the speed fluctuation amplitude of the second gear 112.

In the first embodiment, the phase of the gear tooth 121 at the mesh point B is set to the opposite phase to that at the mesh point A, so that the mesh frequencies $f_1$ and $f_2$ at the mesh points A and B completely cancel each other out and thus the speed fluctuation amplitude of the third gear 113 is minimized. However, the invention is not limited to it; the phase of the gear tooth 121 at the mesh point B may not be the completely opposite phase and may be appropriately selected in a predetermined allowed range if the phase is in the range in which the composite wave is not amplified relative to the mesh vibration of the mesh frequency $f_1$ at the mesh point A.

Figure 9:
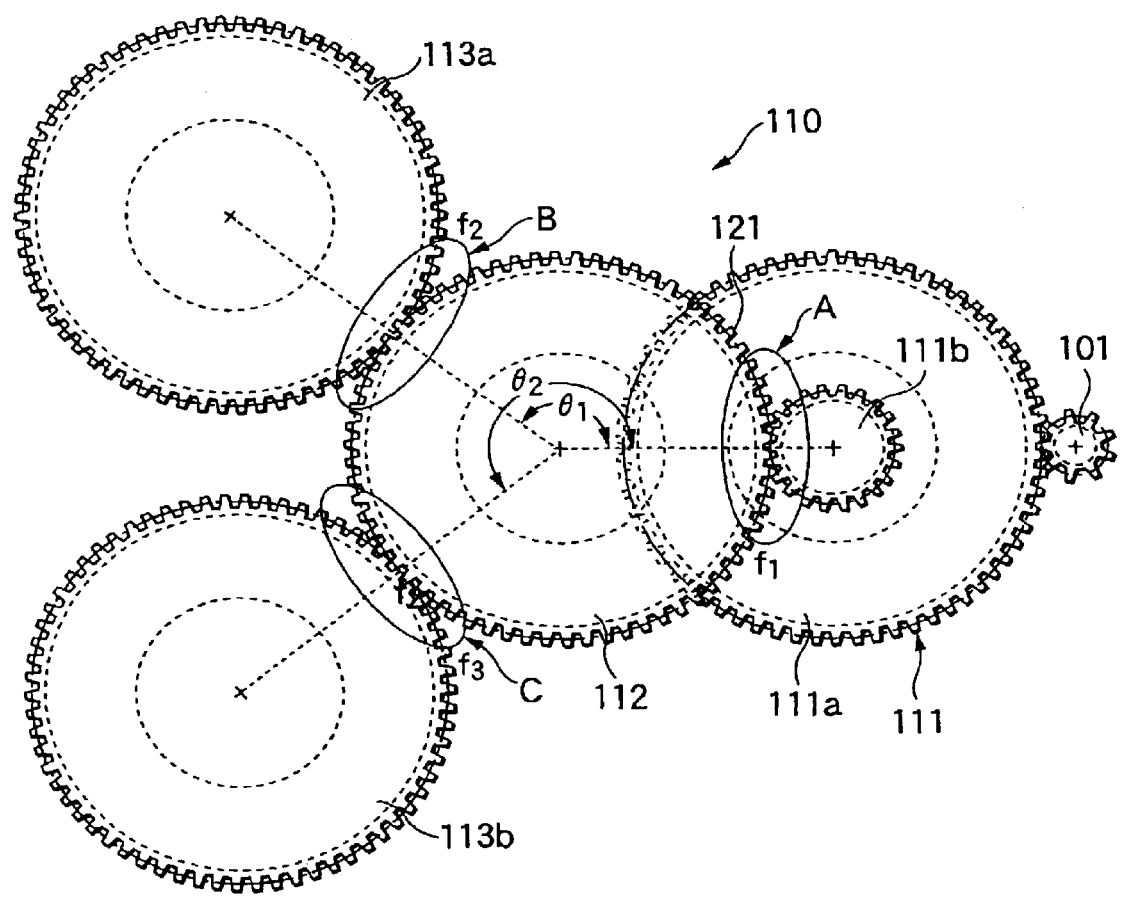
FIG. 9 is a schematic representation to show an outline of a second embodiment of a driving apparatus according to the invention.

Second Embodiment:

FIG. 9 shows a driving apparatus according to a second embodiment to which the invention is applied.

In the figure, a driving apparatus 100 has a first gear 111 for meshing with a drive gear (which will be hereinafter referred to as motor shaft gear as required) 101 toothed in a motor shaft of a drive source and a second gear 112 for meshing with the first gear 111 like the driving apparatus in the first embodiment. However, unlike the driving apparatus in the first embodiment, the driving apparatus 100 is provided with a plurality of third gears 113 (113a and 113b) for meshing with the second gear 112, the third gears 113 being joined to a driven body (not shown) and driven with deceleration.

Particularly, in the embodiment, the phase of a gear tooth 121 at output mesh point B of the second gear 112 (mesh point between the second gear 112 and the third gear 113a) and that at output mesh point C (mesh point between the second gear 112 and the third gear 113b) are set to the opposite phase to the phase of a gear tooth 121 at input mesh point A of the second gear 112 (mesh point between the second gear 112 and a small-diameter gear 111b of the first gear 111).

In the example, assuming that the number of teeth of the second gear 112, the third gear 113a, 113b is m (for example, even number), the number of teeth from mesh point A to mesh point B or from mesh point A to mesh point C is m1 (m1<m) or m2 (m1<m2<m) and angle between the mesh points, θ1, θ2, is set corresponding to the number of teeth.

Therefore, according to the embodiment, when considering the second gear 112 as a center, the mesh phase of the gear tooth 121 at the output mesh point B, C becomes the opposite phase to the mesh phase of the gear tooth 121 at the input mesh point A, so that mesh frequencies (in the example, the fundamental component is considered) $f_1$ and $f_2$, $f_3$ cancel each other out and their composite wave ($f_1+f_2$, $f_1+f_3$) is not amplified relative to the mesh vibration of the mesh frequency $f_1$ and is transmitted downstream.

Thus, in the embodiment, the speed fluctuation amplitude of the third gear 113 branching to two channels relative to the second gear 112 is set equal to or less than the speed fluctuation amplitude of the second gear 112.

Also in the embodiment, the phase of the gear tooth 121 at the mesh point B, C is set to the opposite phase to that at the mesh point A, so that the mesh frequencies $f_1$ and $f_2$, $f_3$ at the mesh points A, B, and C completely cancel each other out and thus the speed fluctuation amplitude of the third gear 113 (113a, 113b) is minimized. However, the invention is not limited to it; the phase of the gear tooth 121 at the mesh point B, C may not be the completely opposite phase and may be appropriately selected in a predetermined allowed range if the phase is in the range in which the composite wave is not amplified relative to the mesh vibration of the mesh frequency $f_1$ at the mesh point A.

Figure 10:
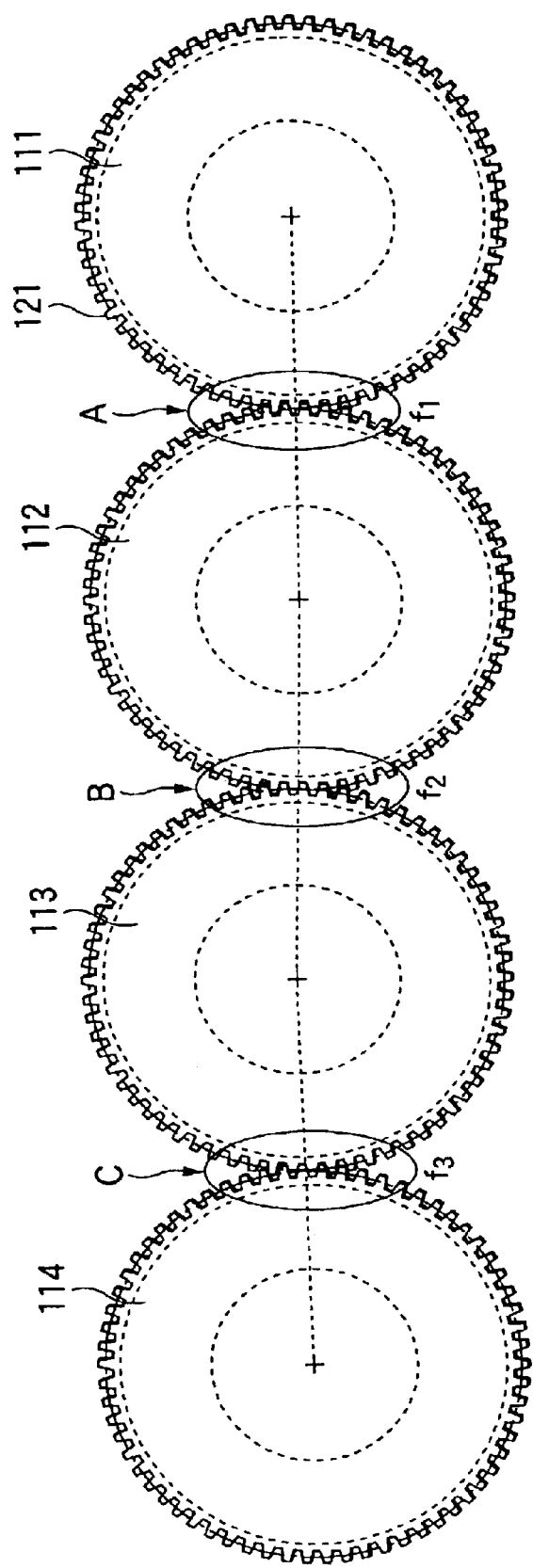
FIG. 10 is a schematic representation to show an outline of a third embodiment of a driving apparatus according to the invention.

Third Embodiment:

FIG. 10 shows a driving apparatus according to a third embodiment to which the invention is applied.

In the figure, a driving apparatus has a four-stage gear train including a first gear 111, a second gear 112, a third gear 113, and a fourth gear 114 for meshing with each other in order, a motor shaft gear (not show) being meshed with the first gear 111 and the fourth gear 114 being joined to a driven body (not shown).

In the embodiment, the first gear 111 to the fourth gear 114 are implemented as the same standardized articles, and the fourth gear 114 is driven with deceleration for a motor shaft.

Figure 11:
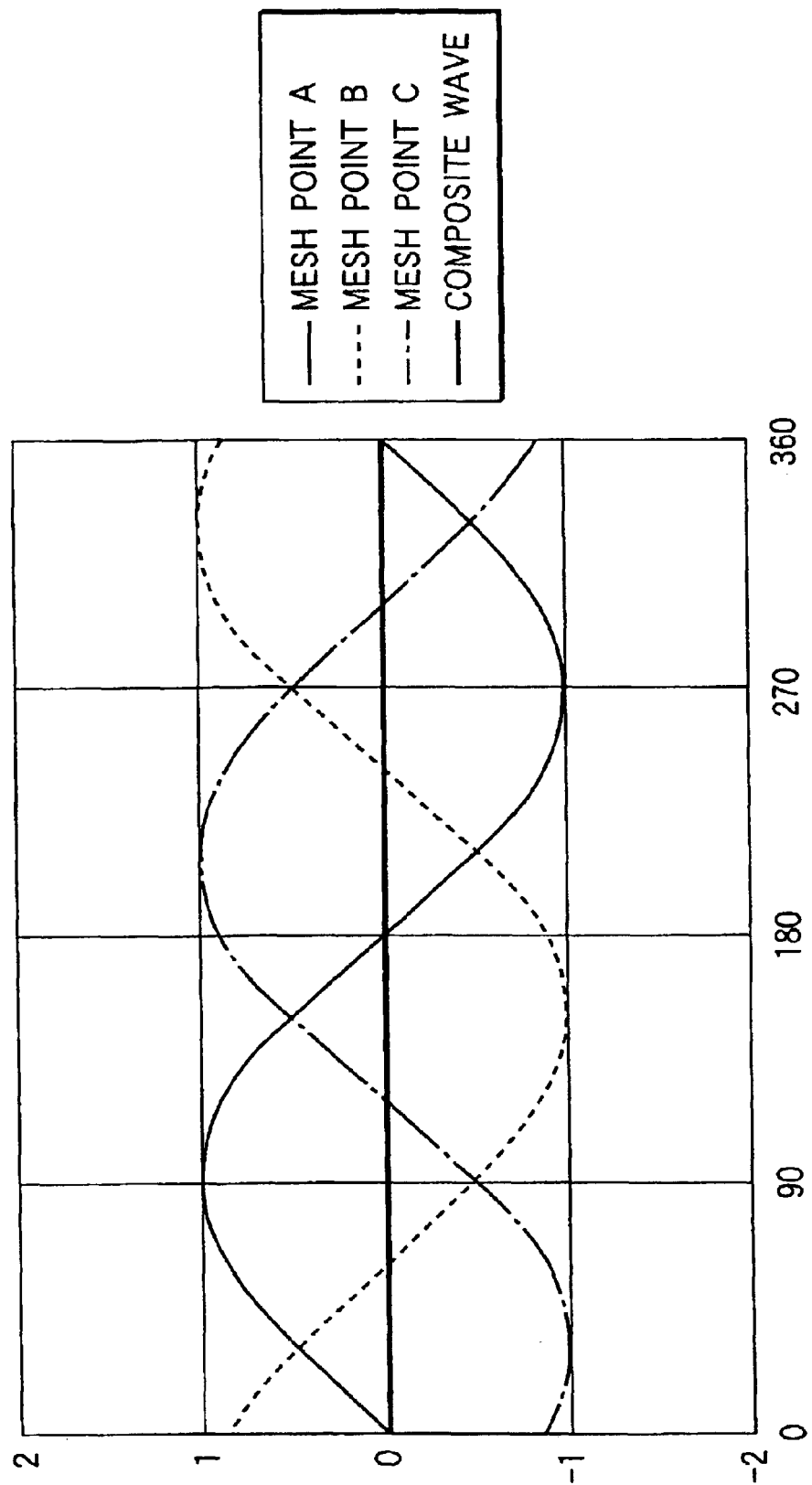
FIG. 11 is a schematic representation to show speed fluctuation phase change at mesh points A, B, and C and composite wave in the third embodiment of the invention.

Particularly, in the embodiment, the mesh phase of a gear tooth 121 at each of mesh point A between the first gear 111 and the second gear 112, mesh point B between the second gear 112 and the third gear 113, and mesh point C between the third gear 113 and the fourth gear 114 is set so that the mesh point B is shifted 120° relative to the mesh point A and that the mesh point C is shifted 240° relative to the mesh point A in the mesh phase, and the mesh phase composite wave of the gear teeth 121 at the mesh points A to C becomes zero, as shown in FIG. 11.

Therefore, according to the embodiment, the mesh phases at the mesh points A to C are shifted phase difference 120° in order, so that mesh frequencies (for example, the fundamental component is considered) $f_1$, $f_2$, and $f_3$ cancel each other out and their composite wave $(f_1+f_2+f_3)$ becomes roughly zero and is not amplified relative to the mesh vibration of the mesh frequency $f_1$, $f_2$ and is transmitted downstream.

Thus, the speed fluctuation amplitude of the fourth gear 114 is set equal to or less than the speed fluctuation amplitude of at least the third gear 113.

In the embodiment, the mesh phases at the mesh points A to C are shifted 120° at a time, but the invention is not limited to it. The phase shift may be in a predetermined allowed range from 120° in the range of the speed fluctuation amplitude of the third gear 113 or less.

Figure 12:
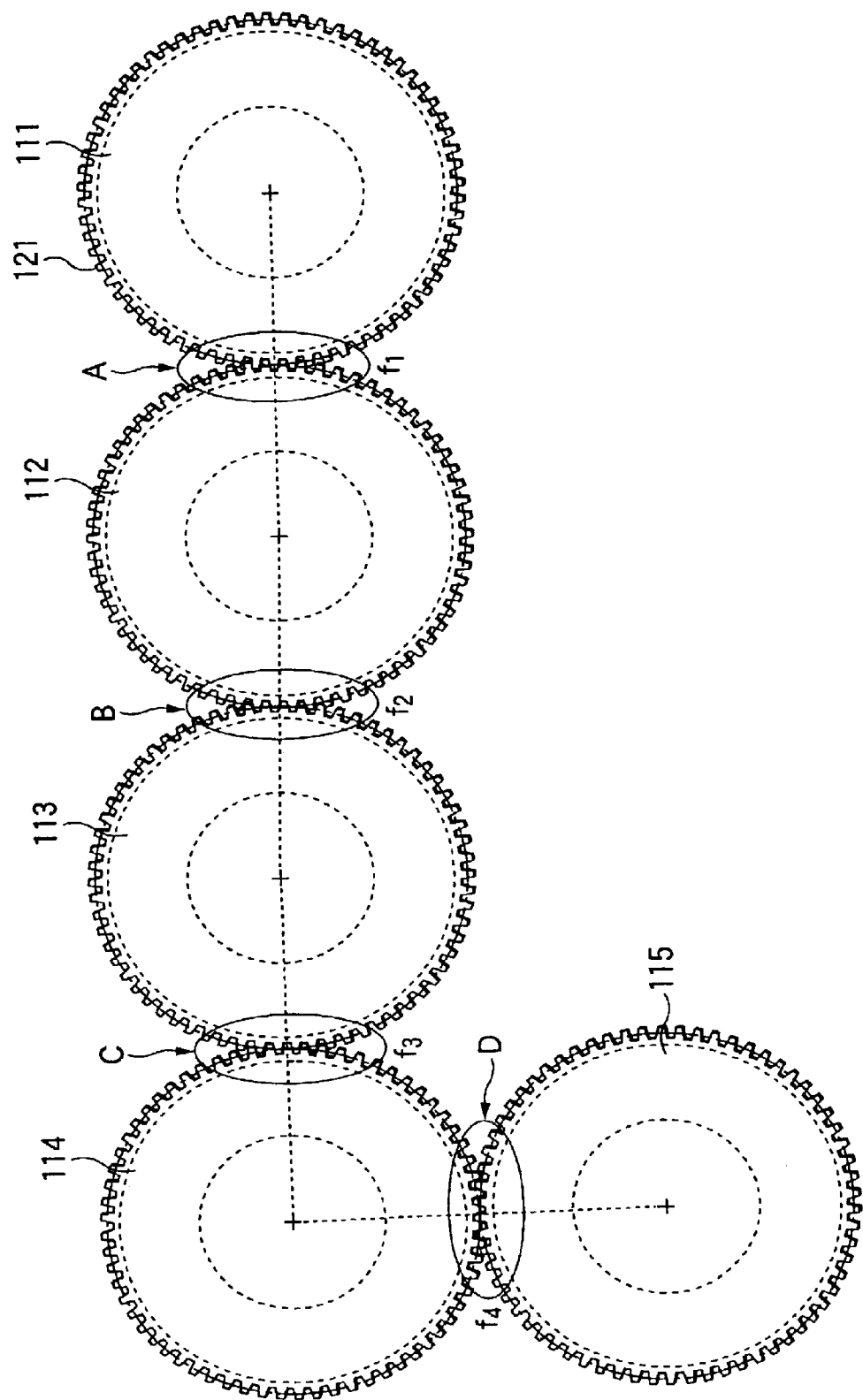
FIG. 12 is a schematic representation to show an outline of a fourth embodiment of a driving apparatus according to the invention.

Fourth Embodiment:

FIG. 12 shows a driving apparatus according to a fourth embodiment to which the invention is applied.

In the figure, a driving apparatus has a five-stage gear train including a first gear 111, a second gear 112, a third gear 113, a fourth gear 114, and a fifth gear 115 for meshing with each other in order, a motor shaft gear (not show) being meshed with the first gear 111 and the fifth gear 115 being joined to a driven body (not shown).

In the embodiment, the first gear 111 to the fifth gear 115 are implemented as the same standardized articles, and the fifth gear 115 is driven with deceleration for a motor shaft.

Figure 13:
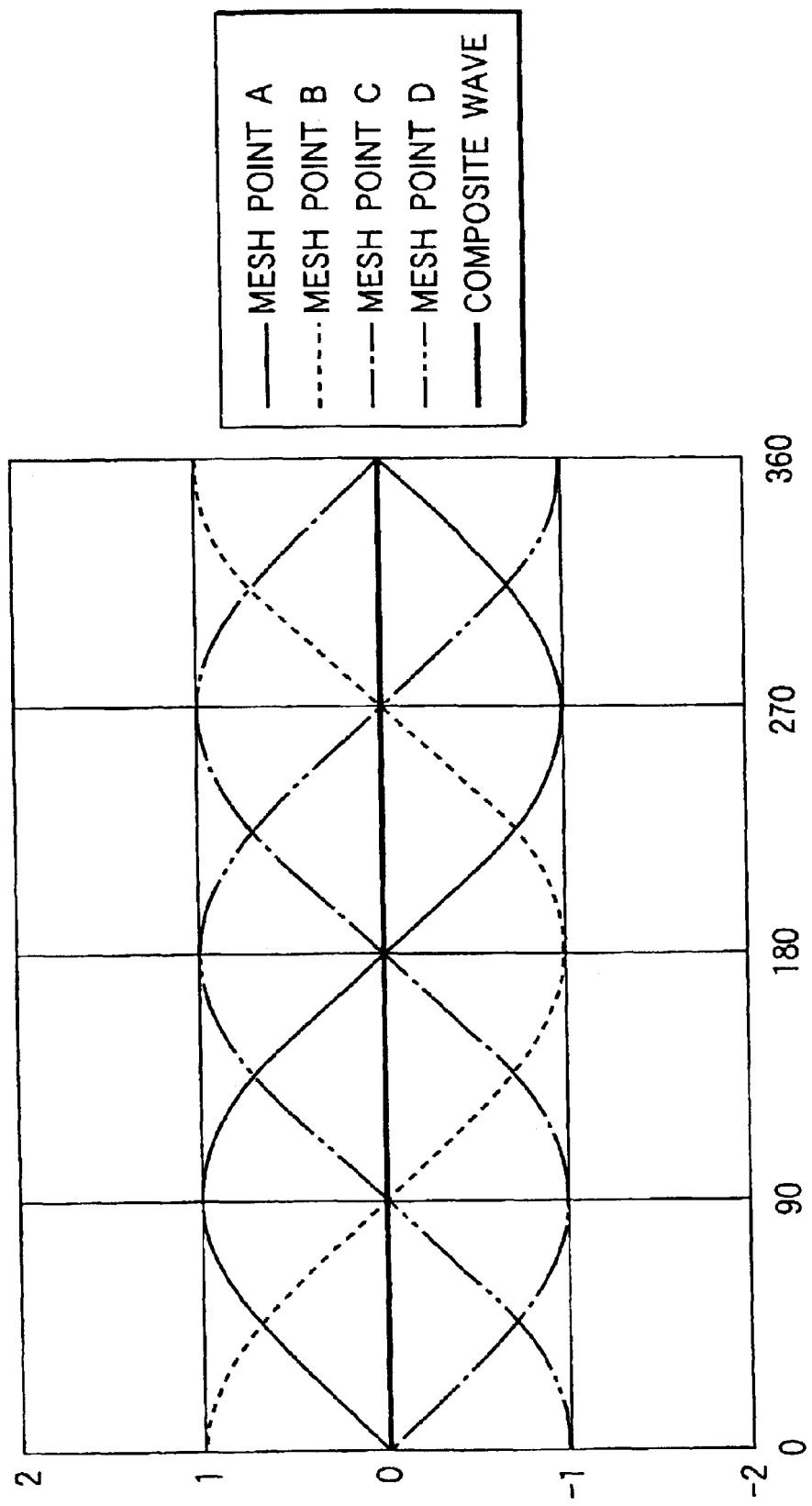
FIG. 13 is a schematic representation to show speed fluctuation phase change at mesh points A, B, C, and D and composite wave in the fourth embodiment of the invention.

Particularly, in the embodiment, the mesh phase of a gear tooth 121 at each of mesh point A between the first gear 111 and the second gear 112, mesh point B between the second gear 112 and the third gear 113, mesh point C between the third gear 113 and the fourth gear 114, and mesh point D between the fourth gear 114 and the fifth gear 115 is set so that the mesh point B is shifted 90° relative to the mesh point A, that the mesh point C is shifted 180° relative to the mesh point A, and that the mesh point D is shifted 270° relative to the mesh point A in the mesh phase, and the mesh phase composite wave of the gear teeth 121 at the mesh points A to D becomes zero, as shown in FIG. 13.

Therefore, according to the embodiment, the mesh phases at the mesh points A to D are shifted phase difference 90° in order, so that mesh frequencies (for example, the fundamental component is considered) $f_1$, $f_2$, $f_3$, and $f_4$ cancel each other out and their composite wave $(f_1+f_2+f_3+f_4)$ becomes roughly zero and is not amplified relative to the mesh vibration of the mesh frequency $f_1$, $f_2$, $f_3$ and is transmitted downstream.

Thus, the speed fluctuation amplitude of the fifth gear 115 is set equal to or less than the speed fluctuation amplitude of at least the fourth gear 114.

In the embodiment, the mesh phases at the mesh points A to D are shifted 90° at a time, but the invention is not limited to it. The phase shift may be in a predetermined allowed range from 90° in the range of the speed fluctuation amplitude of the fourth gear 114 or less.

Figure 14:
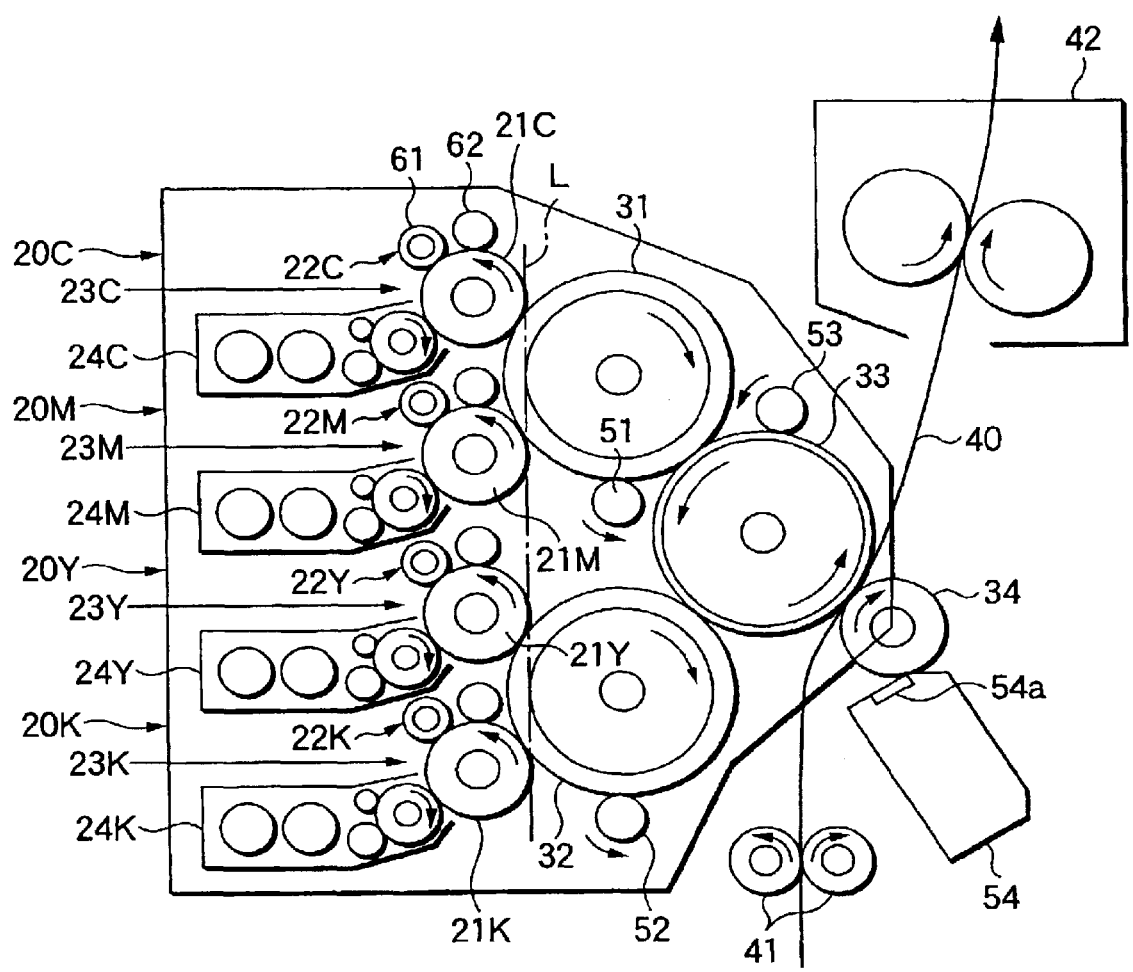
FIG. 14 is a schematic representation to show a fifth embodiment to show an image formation apparatus according to the invention.

Fifth Embodiment:

FIG. 14 shows an image formation apparatus according to a fifth embodiment to which the invention is applied (in the example, full-color printer). Arrows in FIG. 14 indicate the rotation directions of rotation members.

As shown in FIG. 14, the full-color printer includes a main part made up of image formation units 20 (20C, 20M, 20Y, and 20K) having cyan (C), magenta (M), yellow (Y), and black (K) photoconductor drums 21 (21C, 21M, 21Y, and 21K), charging units 22 (22C, 22M, 22Y, and 22K) for primary charging for coming in contact with the photoconductor drums 21, light exposure units such as laser optical units (not shown) for applying cyan (C), magenta (M), yellow (Y), and black (K) color laser light 23 (23C, 23M, 23Y, and 23K), developing units 24 (24C, 24M, 24Y, and 24K) storing developers containing color component toner, a first primary intermediate transfer drum (IDT1) 31 for coming in contact with the two photoconductor drums 21C and 21M of the four photoconductor drums 21, a second primary intermediate transfer drum (IDT1) 32 for coming in contact with the other two photoconductor drums 21Y and 21K, a secondary intermediate transfer drum (IDT2) 33 for coming in contact with the first and second primary intermediate transfer drums 31 and 32, and a final transfer roll 34 for coming in contact with the secondary intermediate transfer drum 33.

The photoconductor drums 21 are placed with a given spacing so as to have a common contact plane L. The first primary intermediate transfer drum 31 and the second primary intermediate transfer drum 32 are placed so that rotation shafts of the drums 31 and 32 are parallel with shafts of the photoconductor drums 21 and the shafts have plane symmetry relationship with respect to a predetermined symmetric plane as the boundary. Further, the secondary intermediate transfer drum 33 is placed so that a rotation shaft of the drum 33 is parallel with the shafts of the photoconductor drums 21.

A signal responsive to image information for each color is rasterized by an image processing unit (not shown) and is input to the laser optical unit (not shown). The laser optical unit modulates color laser light 23 and applies the light to the corresponding color photoconductor drum 21.

In the surroundings of the photoconductor drums 21, an image formation process for each color by known electrophotography is performed.

First, the photoconductor drum 21 is rotated at rotation speed of predetermined process speed.

A DC voltage at a predetermined charge level is applied to the charging unit 22, whereby the surface of the photoconductor drum 21 is charged uniformly to a predetermined level. In the embodiment, only the DC component is applied to the charging unit 22, but an AC component may also be superposed on the DC component.

The laser optical unit as a light exposure unit applies the corresponding color laser light 23 to the surface of the photoconductor drum 21 thus having the uniform surface potential for forming an electrostatic latent image responsive to input image information for each color. As the laser optical unit writes the electrostatic latent image, the surface potential of an image light exposure part on the photoconductor drum 21 is erased to a predetermined level.

The electrostatic latent image corresponding to each color formed on the surface of the photoconductor drum 21 is developed by the corresponding color developing unit 24 and is visualized as a toner image of each color on the photoconductor drum 21.

Next, the color toner images formed on the photoconductor drums 21 are electrostatically primary-transferred onto the first primary intermediate transfer drum 31 and the second primary intermediate transfer drum 32. The cyan (C) and magenta (M) color toner images formed on the photoconductor drums 21C and 21M are transferred onto the first primary intermediate transfer drum 31 and the yellow (Y) and black (K) color toner images formed on the photoconductor drums 21Y and 21K are transferred onto the second primary intermediate transfer drum 32.

After this, the single-color or double-color toner image formed on the first, second primary intermediate transfer drum 31, 32 is electrostatically secondary-transferred onto the secondary intermediate transfer drum 33.

Therefore, a final toner image from a single-color image to a four-color image of cyan (C), magenta (M), yellow (Y), and black (K) is formed on the secondary intermediate transfer drum 33.

Last, the final toner image from a single-color image to a four-color image formed on the secondary intermediate transfer drum 33 is tertiary-transferred by the final transfer roll 34 to paper passing through a paper transport passage 40. The paper undergoes a paper delivery step (not shown), passes through a paper transport roll 41, and is transported to a nip part between the secondary intermediate transfer drum 33 and the final transfer roll 34. After the final transfer step, the final toner image formed on the paper is fixed by a fuser 42. The image formation process sequence is now complete.

In the embodiment, the charging unit 22 comprises a charging roll 61 for charging the photoconductor drum 21 and a brush roll 62 as a refresher upstream from the charging roll 61 for removing foreign material on the photoconductor drum 21 (remaining toner, carrier, etc.,) so as to prevent the foreign material on the photoconductor drum 21 from being transferred to the charging roll 61.

Primary intermediate brush rolls 51 and 52 and a secondary intermediate brush roll 53 as refreshers for temporarily holding foreign material on the surfaces of the primary intermediate transfer drums 31 and 32 and the secondary intermediate transfer drum 33 (remaining toner, carrier, etc.,) are placed in contact with the drums 31, 32, and 33.

Further, the final transfer roll 34 is provided with a cleaning unit 54 (54a: Blade) adopting a blade cleaning technique, for example.

Next, a driving apparatus used in the embodiment will be discussed.

Figure 15:
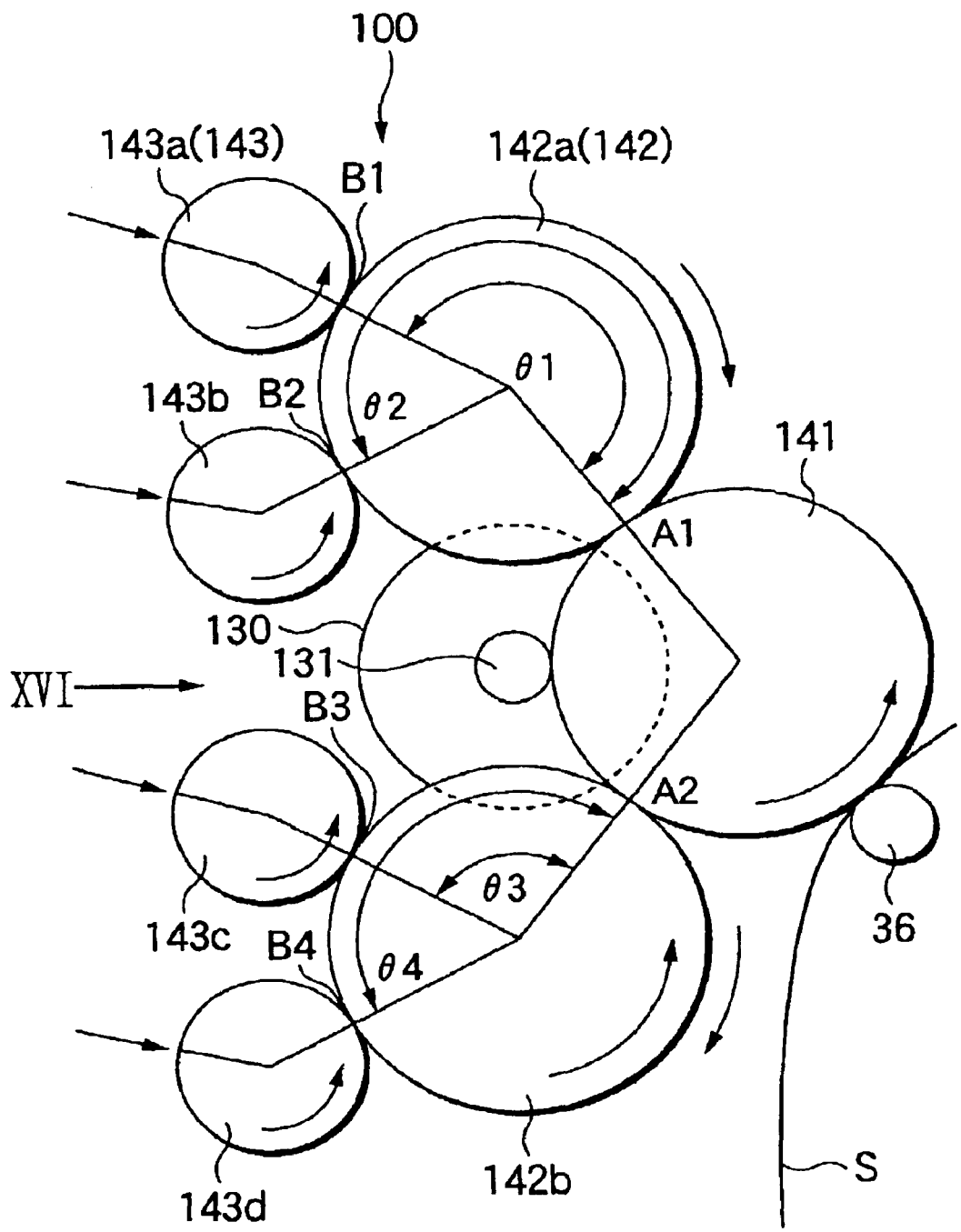
FIG. 15 is a schematic representation to show a driving apparatus used in the fifth embodiment of the invention.
Figure 16:
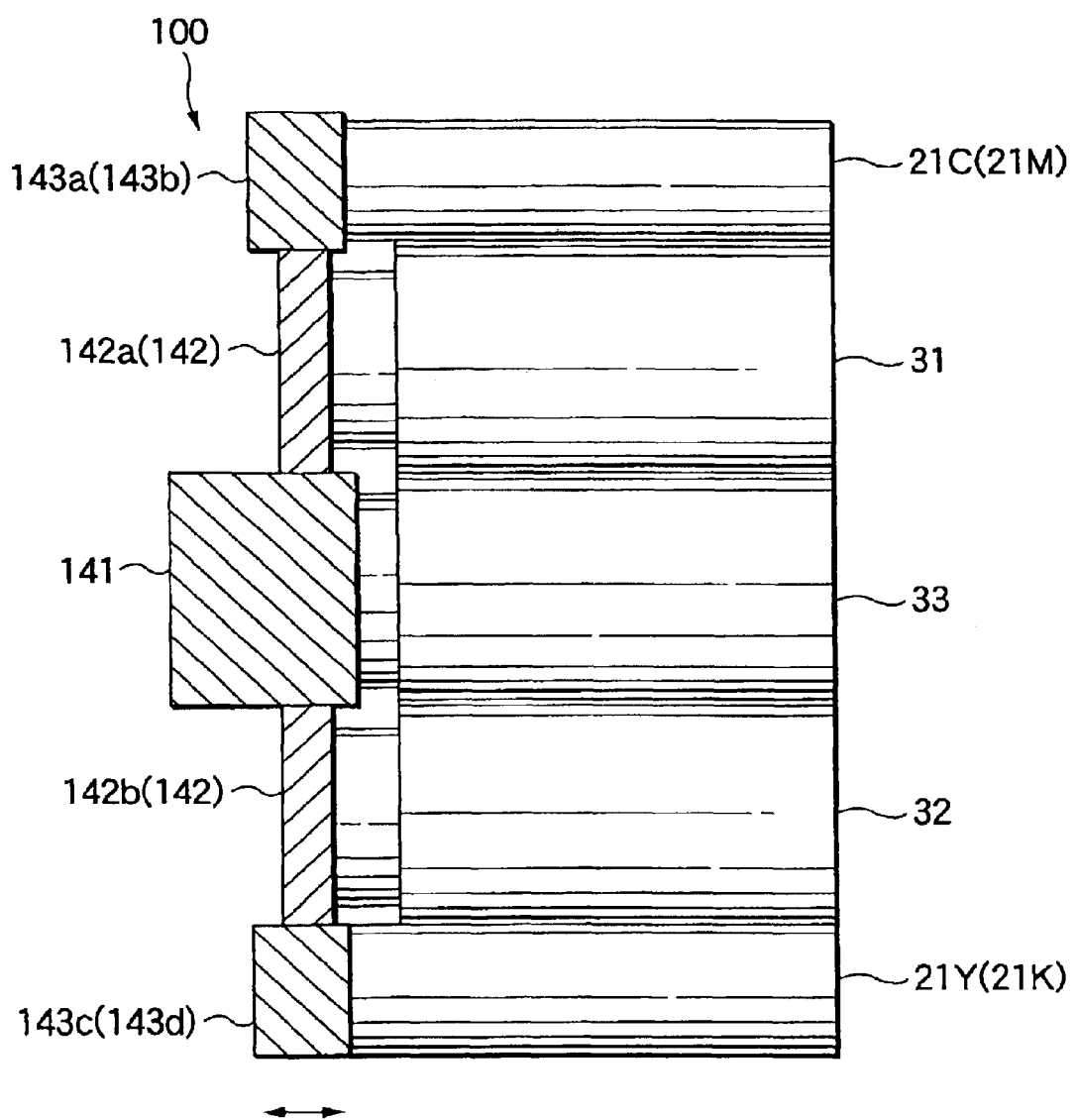
FIG. 16 is an arrow view from XVI direction in FIG. 15.

In the embodiment, a driving apparatus 100 has a first gear 141 (in the example, joined to the secondary intermediate transfer drum 33) meshed with a motor shaft gear 130 of a drive motor 130, a plurality of second gears 142, specifically 142a and 142b (in the example, joined to the primary intermediate transfer drums 31 and 32) meshed with the first gear 141, and further a plurality of third gears 143, specifically 143a to 143d (in the example, joined to the photoconductor drums 21C, 21Y, 21M, and 21K) meshed with the second gears 142a and 142b for driving the photoconductor drums 21 (21C, 21Y, 21M, and 21K) at increased speed relative to the primary intermediate transfer drums 31 and 32, as shown in FIGS. 15 and 16. In FIG. 15, numeral 36 denotes a final transfer roll and S denotes paper.

Further, in the driving apparatus, letting the rotation angle of one tooth of the first gear (IDT2 drive gear) 141 be θp and n1 to n4 be integers, each angle between primary transfer and secondary transfer for each color, θ1, θ2, θ3, θ4, is set so that θ1=n1·θp, θ2=n2·θp, θ3=n3·θp, and θ4=n4·θp.

The first gear 141, the second gears 142, and the third gears 143 are implemented as helical gears; face-width w2 of the second gear 142 (142a, 142b) of the IDT drive gear is set smaller than face-width w1 of the first gear 141 meshing with the second gear 142 and face-width w3 of the third gear 143 (143a to 143d) meshing with the second gear 142.

Particularly, in the embodiment, the third gear 143 is placed movably in the axial direction and the mesh width with the second gear 142 is adjusted, whereby the mesh phase of a gear tooth at a mesh point with the second gear 142 is adjusted to a predetermined mesh phase.

Next, the operation of the driving apparatus according to the embodiment will be described.

In the embodiment, the driving apparatus 100 has the three-stage gear train (first gear 141 to third gears 143) branching to a plurality of parts, and the mesh phases at mesh points of the gears 141 to 143, A (specifically A1 and A2) and B (specifically B1 to B4), are set to the same phase.

At this time, in same-speed or deceleration mode, mesh vibration of mesh frequency at each mesh point A, B would be amplified. However, in speed increasing mode as in the embodiment, if the mesh phases at the mesh points A and B are the same phases, the mesh vibration of the mesh frequency is not amplified and the speed fluctuation amplitude of the third gear 143 of the photoconductor drum drive gear is suppressed to the range of the speed fluctuation amplitude of the second gear 142 of the primary intermediate transfer drum drive gear or less.

Therefore, the rotation speed fluctuation of the photoconductor drum 21 can be minimized and an image defect (banding) caused by expansion or contraction of an image caused by the speed fluctuation of the mesh frequency of the multiple-stage gear train is circumvented effectively.

Further, in the embodiment, the speed fluctuation phase of the primary intermediate transfer drum (IDT1) 31, 32 at the primary transfer point caused by the mesh between the second gear 142 of the IDT1 drive gear and the third gear 143 of the photoconductor drum drive gear and the speed fluctuation phase of the secondary intermediate transfer drum (IDT2) 33 at the secondary transfer point match, so that expansion or contraction of an image caused by the speed fluctuation can be canceled and thus a good image with no banding can be provided.

Particularly, in the embodiment, the face-width of the second gear 142 of the IDT1 drive gear is set smaller than the face-width of the first gear 141 and third gear 143 meshing with the second gear 142. Thus, if the axial position of the photoconductor drum 21, the primary intermediate transfer drum 31, 32, or the secondary intermediate transfer drum 33 varies, the second gear 142 meshes with the first gear 141 and the third gears 143 throughout all area of the face-width and the speed fluctuation phase relationship less changes.

Thus, according to the embodiment, the distance between the primary transfer point and the secondary transfer point may be set to an integral multiple of the one-pitch distance of the first gear 141 of the IDT2 drive gear without using any flywheel, so that the image quality can be enhanced without upsizing the driving apparatus itself.

Figure 17:
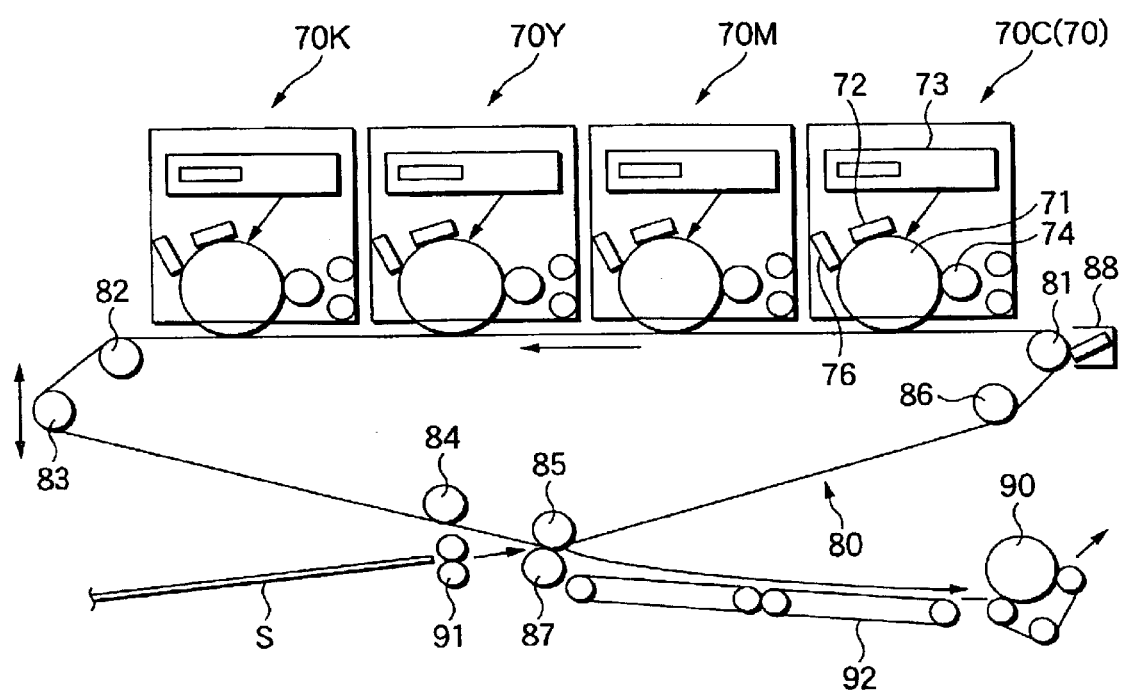
FIG. 17 is a schematic representation to show a sixth embodiment to show an image formation apparatus incorporating the invention.

Sixth Embodiment:

FIG. 17 shows an image formation apparatus according to a sixth embodiment to which the invention is applied.

In the figure, the image formation apparatus is an intermediate transfer type image formation apparatus like that in the fifth embodiment, but differs from that in the fifth embodiment in that the image formation apparatus has four image formation units 70 (specifically 70C, 70M, 70Y, and 70K) being disposed in parallel for forming images of a plurality of color components (in the example, cyan (C), magenta (M), yellow (Y), and black (K)) and an intermediate transfer belt 80 disposed below the image formation units 70, to transfer the color component images formed in the image formation units 70 via the intermediate transfer belt 80 to paper S as a record material and to fix an unfixed image on the paper S in a fuser 90.

In the embodiment, each image formation unit 70 has a photoconductor drum 71 rotating in a predetermined direction, surrounded by a charging unit 72 for charging the photoconductor drum 71, a light exposure unit 73 for writing an electrostatic latent image onto the charged photoconductor drum 71, a developing unit 74 for developing the electrostatic latent image on the photoconductor drum 71 in the corresponding color component toner, a primary transfer unit (not shown) for primary-transferring the color component toner image on the photoconductor drum 71 to the intermediate transfer belt 80, and a cleaning unit 76 for cleaning the remaining toner on the photoconductor drum 71.

The intermediate transfer belt 80 is placed on a plurality of tension rolls 81 to 86 and is circulated with the tension roll 81 as a drive roll, for example.

In FIG. 17, numeral 87 denotes a secondary transfer unit (in the example, transfer roll) for transferring an image on the intermediate transfer belt 80 to paper S, numeral 88 denotes a belt cleaning unit for cleaning the remaining toner on the intermediate transfer belt 80, numeral 91 denotes a registration roll for registering the paper S before the secondary transfer part, and numeral 92 denotes a transport belt for transporting the paper S passing through the secondary transfer unit 87 to a fuser 90.

Figure 18:
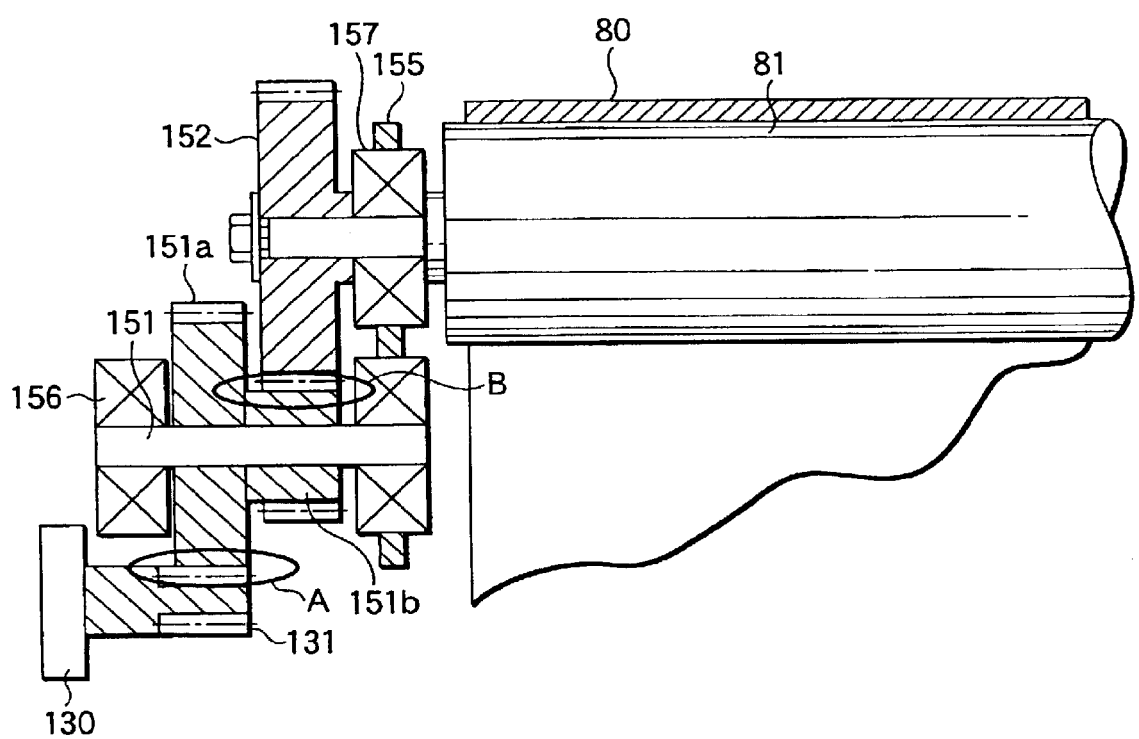
FIG. 18 is a schematic representation to show a driving apparatus used in the sixth embodiment of the invention.

Next, FIG. 18 shows a driving apparatus 100 of the intermediate transfer belt 80.

In the embodiment, as shown in FIG. 18, the driving apparatus 100 has a large-diameter gear 151a of a first gear 151 (in the example, two-step gear) meshed with a motor shaft gear 131 of a drive motor 130 and a second gear 152 meshed with a small-diameter gear 151b of the first gear 151, the second gear 152 being jointed to the drive roll 81 for driving the drive roll 81 with deceleration.

In FIG. 18, numeral 155 denotes a module frame of the intermediate transfer belt 80 and numerals 156 and 157 denote bearings for supporting the gears 151 and 152 for rotation.

Particularly, in the embodiment, the mesh phase at mesh point A between the gear 151 and the motor shaft gear 131 and the mesh phase at mesh point B between the gears 151 and 152 are adjusted to roughly opposite phases and the mesh frequencies at the mesh points A and B cancel each other out, so that the speed fluctuation amplitude of the second gear 152 is set equal to or less than the speed fluctuation amplitude of the first gear 151.

According to the embodiment, the effect of the speed fluctuation component caused by the mesh components of the multiple-stage gear train of the driving apparatus 100 is lessened and the speed fluctuation amplitude of the second gear 152 of the driving apparatus 100 is suppressed to a small amplitude, so that the rotation operation of the drive roll 81 becomes stable and the circulating operation of the intermediate transfer belt 80 becomes stable accordingly.

Thus, the motion quality of the intermediate transfer belt 80 is enhanced and an image defect of banding, etc., is prevented effectively.

Figure 19:
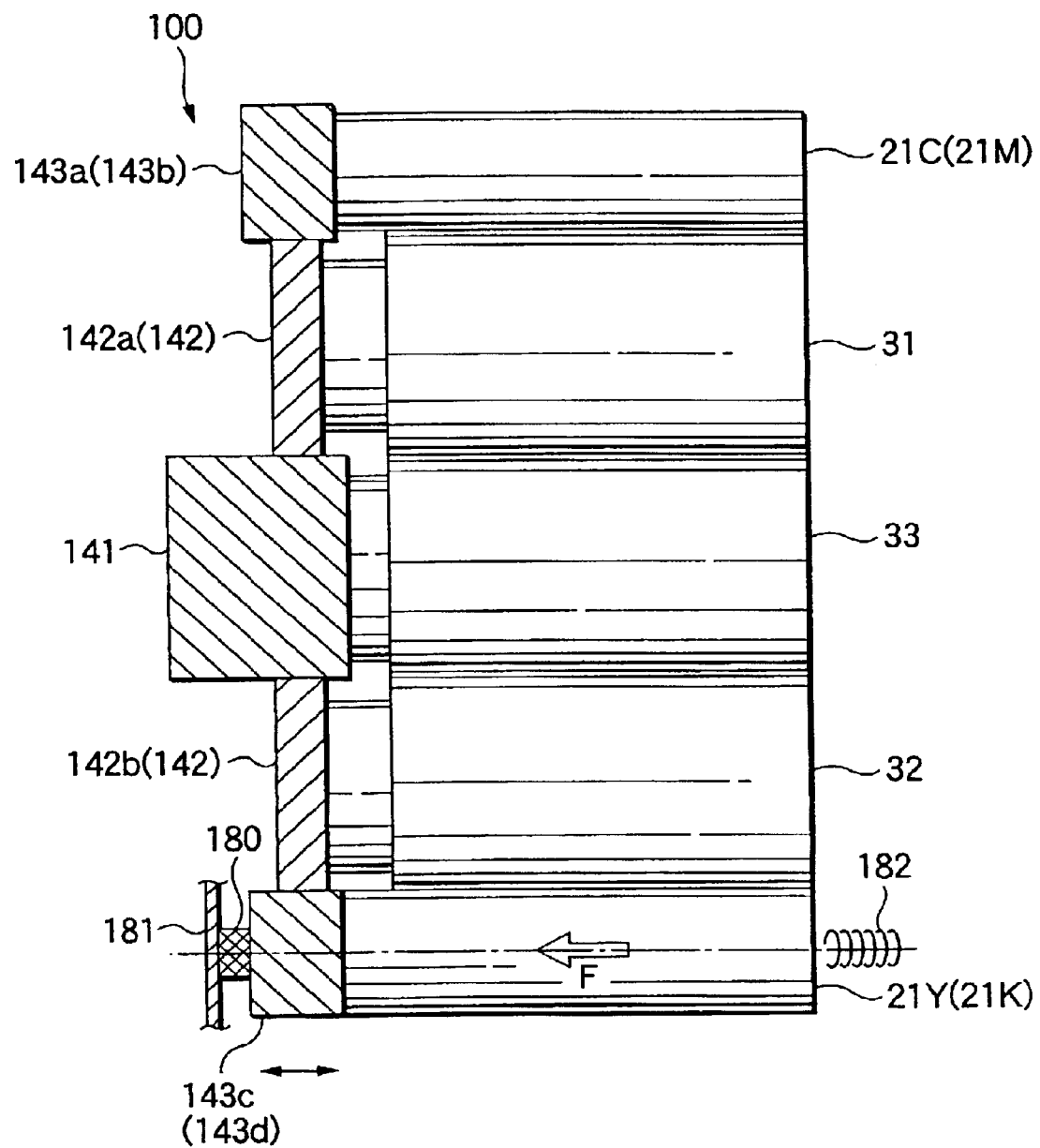
FIG. 19 is a schematic representation to show a driving apparatus used in an image formation apparatus according to a seventh embodiment of the invention (an arrow view from a similar direction to that in FIG. 16)

Seventh Embodiment:

FIG. 19 shows a driving apparatus according to a seventh embodiment, which is used in an image formation apparatus, to which the invention is applied and is an arrow view from a similar direction to that in FIG. 16.

In FIG. 19, the basic configuration of the driving apparatus is roughly similar to that in the fifth embodiment. The driving apparatus has a position regulation member 180 for regulating an axial position of a helical gear 143c (143d) at an axial end thereof.

Although not shown, the position regulation member 180 is also provided at axial ends of the other helical gears including a helical gear 143a (143b) as required.

Parts similar to those previously described in the fifth embodiment are denoted by similar reference numerals in FIG. 19 and will not be discussed again in detail.

For example, a block, a bush, etc., may be appropriately selected as the position regulation member 180. For example, the position regulation member 180 is fixed to an apparatus frame 181 and blocks an axial move of the helical gear 143c (143d) to regulate the axial position thereof.

In the embodiment, an elastic member 182 of a spring, etc., is placed at an opposite end to the helical gear 143c (143d) of a photoconductor drum 21Y (21K), and the helical gear 143c (143d) is pressed against the position regulation member 180 by press force F of the urging force of the elastic member 182. It may be pressed rigidly by fastening member such as a screw, in place of the elastic member 182.

Therefore, according to the embodiment, in addition to providing roughly similar advantages to those in the fifth embodiment, if the helical gear 143c (143d) has looseness in the axial direction, the axial position of the helical gear 143c (143d) is regulated constantly because the helical gear 143c (143d) is always pressed against the position regulation member 180.

Thus, the speed fluctuation phase of the mesh frequency in the helical gear 143c (143d) is held constant and the speed fluctuation of the mesh frequency of multiple-stage gear train is more lessened as compared with the case where looseness is included.

Figure 20:
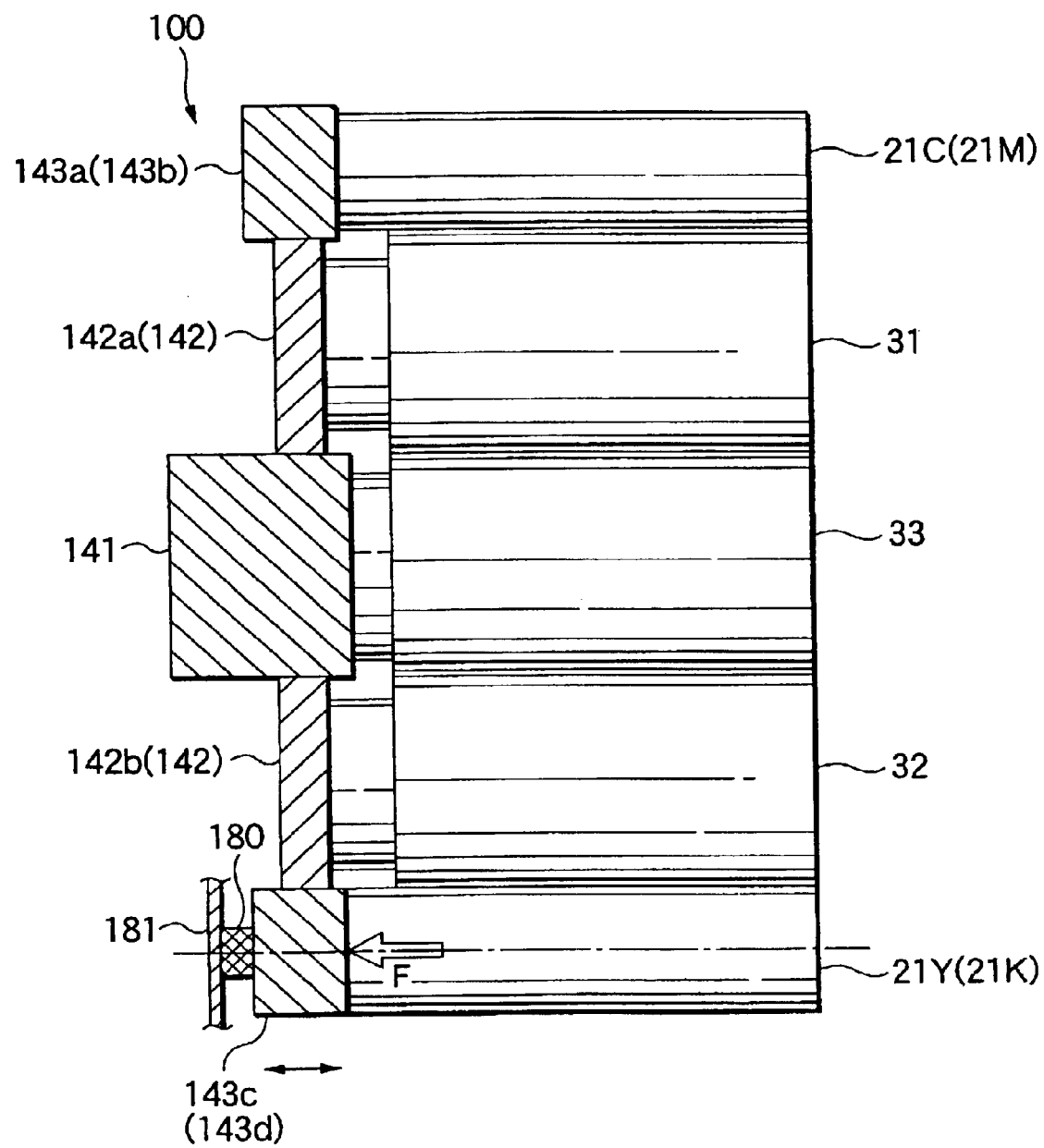
FIG. 20 is a schematic representation to show a modification of the driving apparatus used in the seventh embodiment of the invention.

In the embodiment, the helical gear 143c (143d) is pressed against the position regulation member 180 by a separate member such as the elastic member 182, but the invention is not limited to it. For example, as shown in FIG. 20, the position regulation member 180 may be placed in a direction in which thrust produced in the helical gear 143c (143d) acts, and the thrust itself may be adopted as the press force F against the position regulation member 180.

According to the modification, if the driving apparatus is operated, the helical gear 143c (143d) is always abutted against the position regulation member 180, so that the position of the helical gear 143c (143d) is regulated by a small press force without providing a separate member for pressing.

Further, in the embodiment, the position regulation member 180 may regulate the axial position of the helical gear 143c (143d); it maybe configured so as to also regulate another position in any other direction.

Figure 21A:
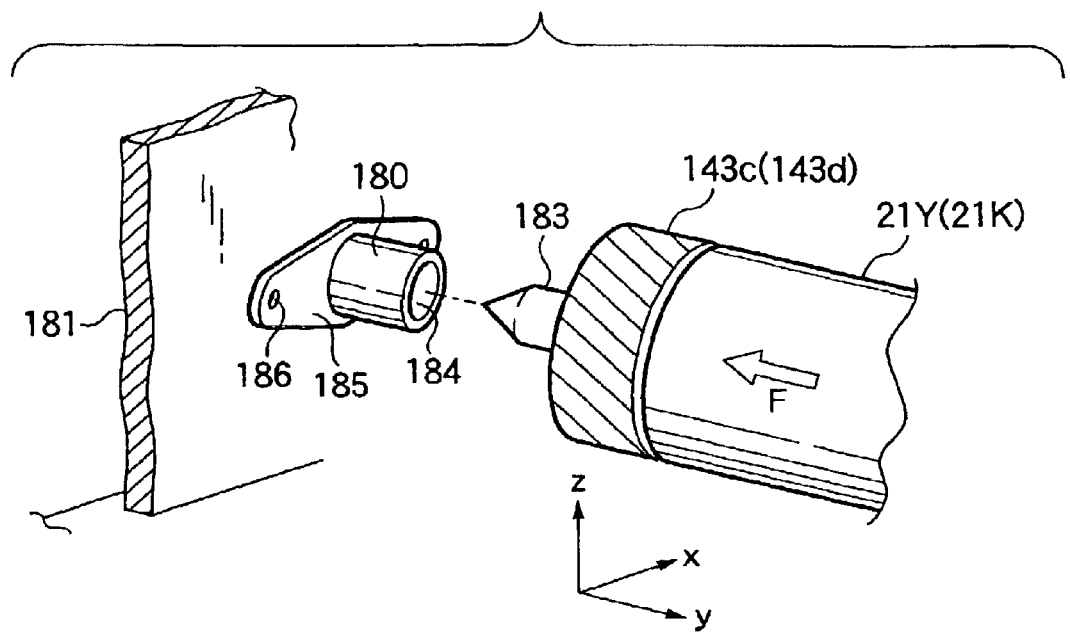
FIG. 21(a) is a schematic representation to show another modification of the driving apparatus used in the seventh embodiment of the invention and FIG. 21(b) is a schematic representation to show the cross section of the modification of the driving apparatus.
Figure 21B:
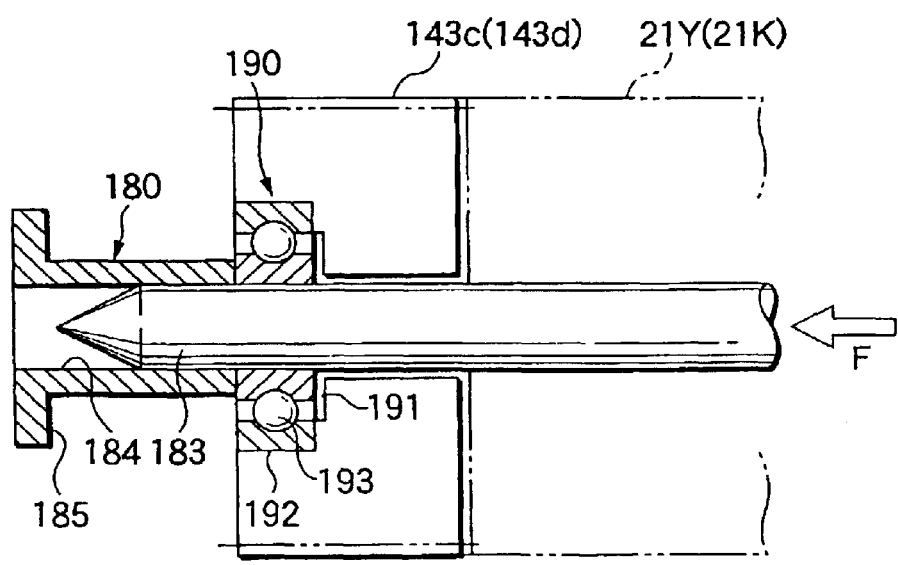

This kind of position regulation structure is as follows: For example, as shown in FIGS. 21(a) and 21(b), a positioning boss 183 is projected at an end part of a shaft of the photoconductor drum 21Y (21K) and on the other hand, to use a bush, for example, as the position regulation member 180, a bush 180 having amounting plate 185 is fixed to the apparatus frame 181 through a retainer 186 of a screw, etc., and is formed with a positioning emboss 184 into which the positioning boss 183 is fitted, and an inner ring 191 of a bearing 190 supporting the helical gear 143c (143d) for rotation, for example, is abutted against a marginal end part of the positioning emboss 184 of the bush 180 by predetermined press force F. In the example, the bearing 190 has a ball 193 placed between the inner ring 191 and an outer ring 192, which is fixed to the helical gear 143c (143d).

According to the embodiment, the inner ring 191 of the bearing 190 is abutted against the bush 180, whereby the axial position of the helical gear 143c (143d) is regulated. In addition, the positioning boss 183 is fitted into the positioning emboss 184 of the bush 180, whereby the plane direction position of the helical gear 143c (143d) is regulated. The plane direction is orthogonal to the axial direction.

In the example, the positioning boss 183 on the shaft side is supported on the bush 180 in a non-rotation state, but the positioning boss 183 rotatable relative to the bush 180 may be supported.

Figure 22:
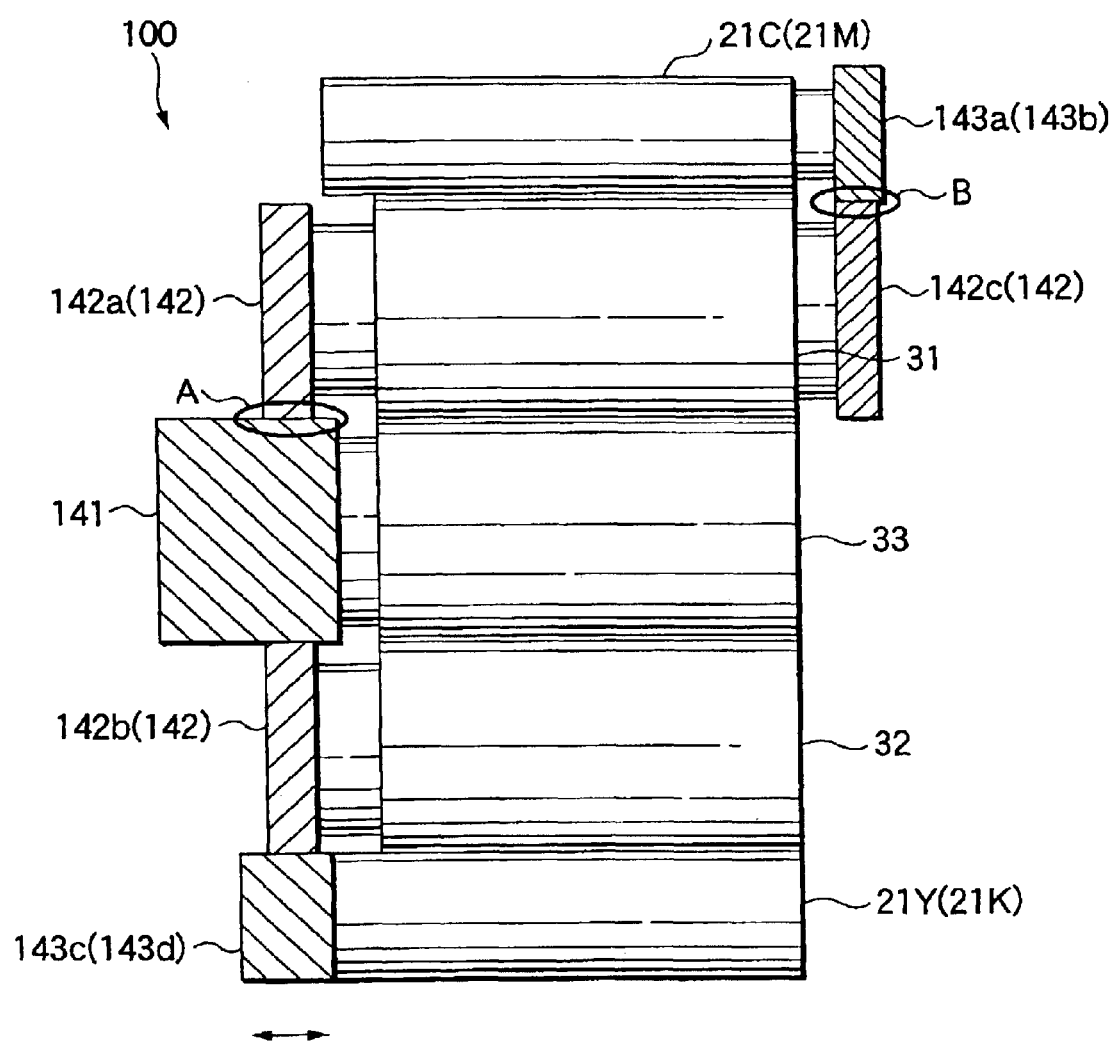
FIG. 22 is a schematic representation to show a driving apparatus used in an image formation apparatus according to an eighth embodiment of the invention (an arrow view from a similar direction to that in FIG. 16)

Eighth Embodiment:

FIG. 22 shows a driving apparatus according to an eighth embodiment, which is used in an image formation apparatus, to which the invention is applied and is an arrow view from a similar direction to that in FIG. 16.

The eighth embodiment differs from the first to seventh embodiments in that it considers the case where the harmonic component, for example, the second harmonic wave of the mesh frequency of a multiple-stage gear train much occurs than the fundamental component thereof.

In the eighth embodiment, the basic configuration of the driving apparatus is roughly similar to that in the fifth embodiment. In the eighth embedment, unlike the fifth embodiment, a second gear 142a (142) is joined to one axial end of a first primary intermediate transfer drum 31, another second gear 142c (142) is joined to an opposite axial end of the primary intermediate transfer drum 31, and further a third gear 143a (143b) joined to a photoconductor drum 21C (21M) is meshed with the second gear 142c (142) for driving the photoconductor drum 21C (21M) through the third gear 143a (143b). Parts similar to those previously described in the fifth embodiment are denoted by similar reference numerals in FIG. 22 and will not be discussed again in detail.

Particularly, in the embodiment, double gears (second gears 142a and 142c) are placed at both axial ends of the first primary intermediate transfer drum 31 and assuming that the number of teeth of the second gear 142a on the input side is Z1 and that the number of teeth of the second gear 142c on the output side is Z2, Z2 is set so as to become equal to 2×Z1 (Z2=2×Z1).

Figure 23A:
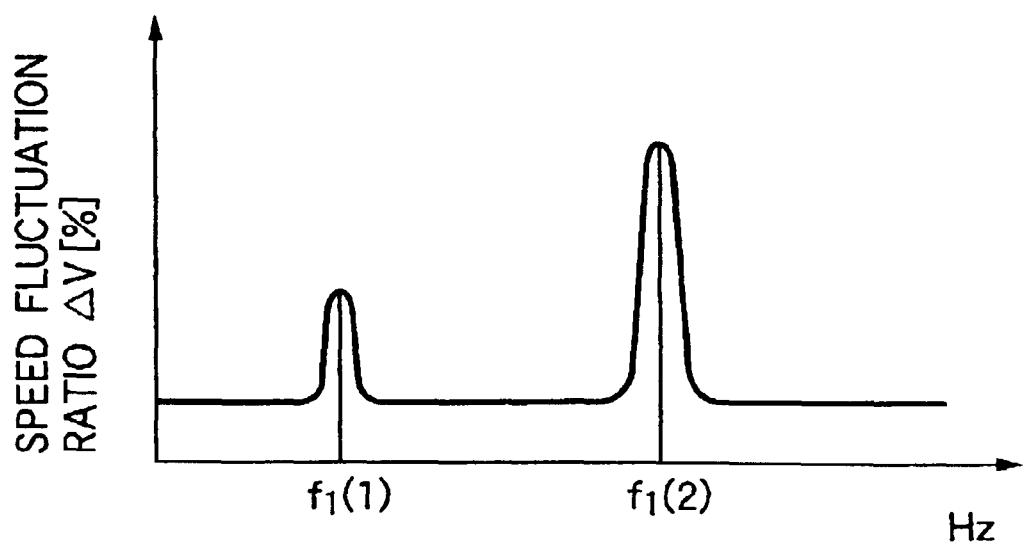
FIG. 23(a) is a schematic representation to show the mesh frequency characteristic at mesh point A in FIG. 22

In the embodiment, it is assumed that harmonic component f1(2) of second harmonic wave (f1(2)=2×f1(1)) has larger speed fluctuation ratio ΔV (%) at a mesh point A between a first gear 141 and the second gear 142a on the input side in the driving apparatus than the fundamental component f1(1) as shown in FIG. 23(a).

At this time, in the embodiment, the mesh frequency at the second gear 142c on the output side is set to an integral multiple (in the example, twice) as compared with that at the second gear 142a on the input side from the relation of the gear ratio between the second gear 142a on the input side and the second gear 142c on the output side.

Figure 23B:
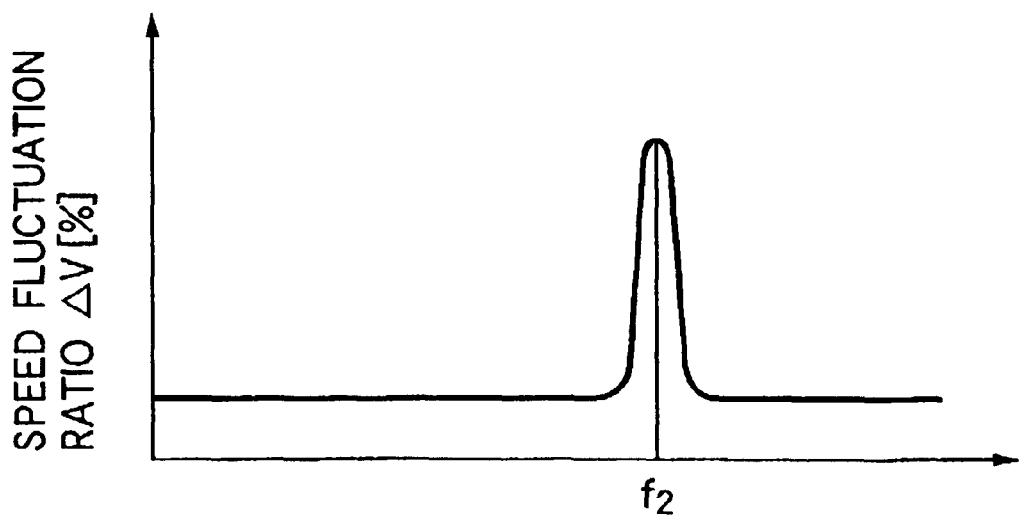
FIG. 23(b) is a schematic representation to show the mesh frequency characteristic at mesh point B in FIG. 22.

Thus, the speed fluctuation ratio ΔV (%) at mesh point B between the second gear 142c on the output side and the third gear 143a (143b) largely changes at mesh frequency f2, for example, as shown in FIG. 23(b); the mesh frequency f2 corresponds to the frequency corresponding to the harmonic component f1(2) of the mesh frequency at the mesh point A.

Therefore, the speed fluctuation phases at the mesh points A and B are set appropriately in the multiple-stage gear train of the first gear 141, the second gears 142a and 142c, and the third gear 143a (143b), whereby the harmonic component f1(2) of the mesh frequency before change (the mesh frequency on the input side) and the mesh frequency f2 after change (the mesh frequency on the output side) can be canceled out.

In the embodiment, for example, if harmonic component f1(3) of third harmonic wave of the fundamental component of the mesh frequency at the mesh point A much occurs, for example, assuming that the number of teeth of the second gear 142a on the input side is Z1 and that the number of teeth of the second gear 142c on the output side is Z2, Z2 is set so as to become equal to 2×Z1 (Z2=2×Z1), and the speed fluctuation phases at the mesh points A and B may be set so as to cancel out the harmonic component f1(3) of the mesh frequency before change (the mesh frequency on the input side) and the mesh frequency f2 after change (the mesh frequency on the output side).

FIRST EXAMPLE

Figure 24A:
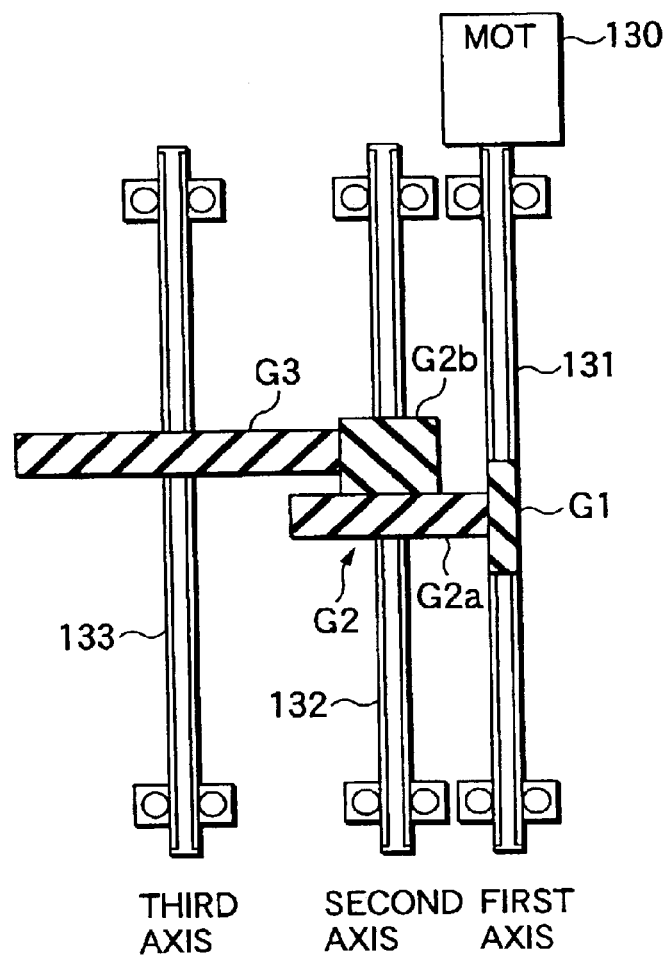
FIG. 24(a) is a plane schematic representation to show a driving apparatus according to a first example and FIG. 24(b) is a front schematic representation.
Figure 24B:
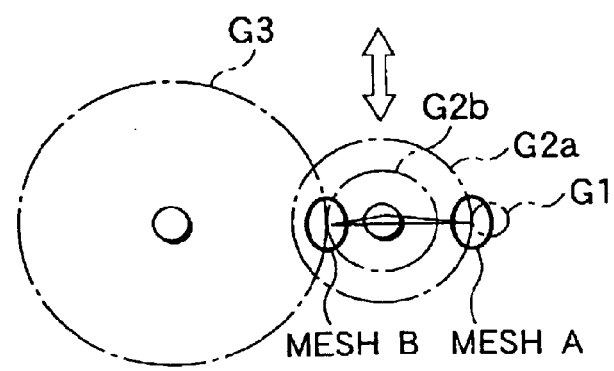

As shown in FIGS. 24(a) and 24(b), a first example is a driving apparatus having a three-stage gear train of gears G1 to G3 driven by a motor shaft 131 of a drive motor 130, wherein the first gear G1 is joined to the motor shaft 131, a large-diameter gear G2a of the second gear G2 having two-step gear structure is meshed with the first gear G1, the third gear G3 at the following stage thereof is meshed with a small diameter gear G2b of the second gear G2, and the center of the second gear G2 is moved up and down for changing the phase difference between mesh point A between the first gear G1 and the large-diameter gear G2a of the second gear G2 and mesh point B between the small-diameter gear G2b of the second gear G2 and the third gear G3.

Figure 25:
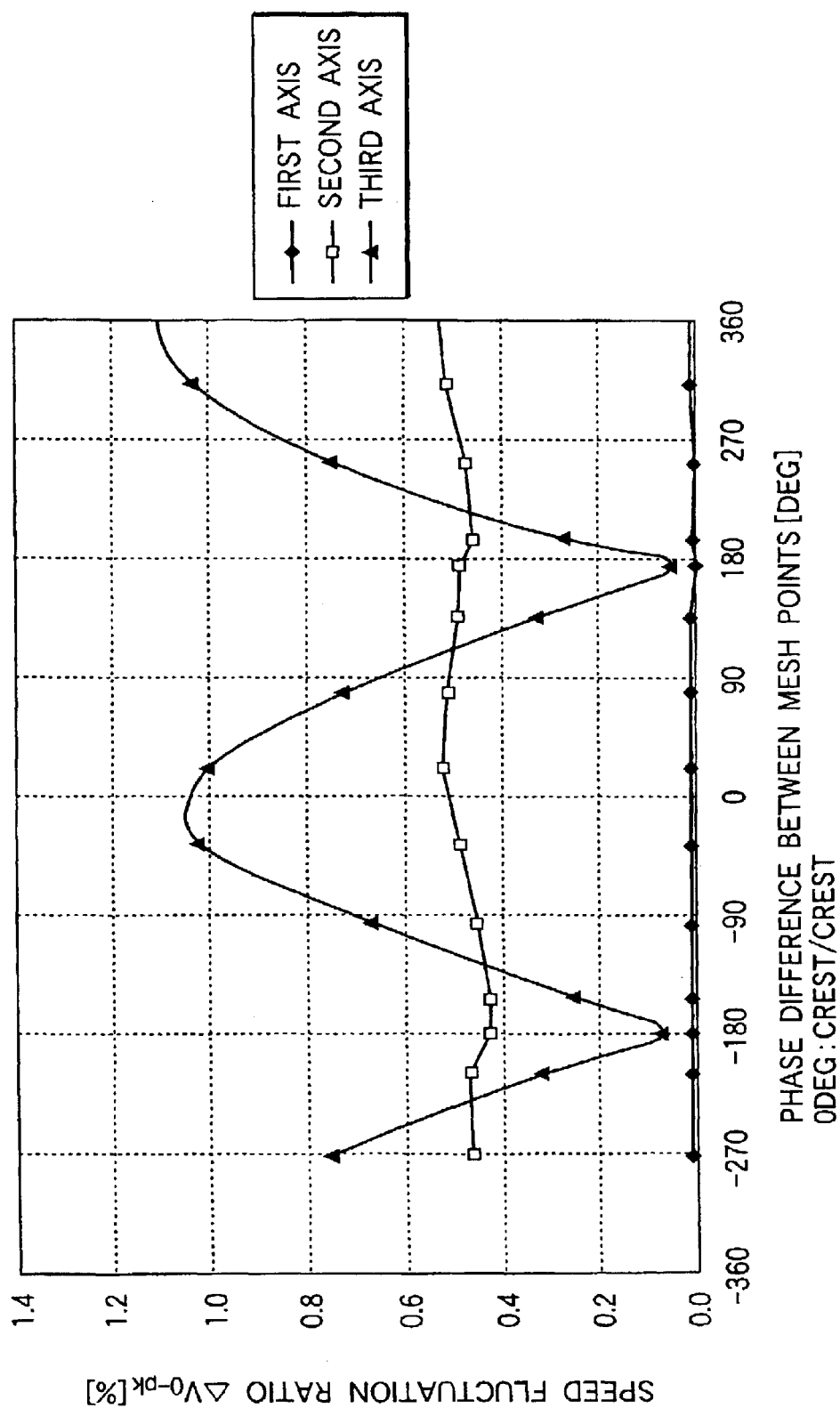
FIG. 25 is a graph to show the relationship between the phase difference between mesh points of gears and the speed fluctuation ratio of gear shafts in the first example.

In the example, when the phase difference between the mesh points was changed and speed fluctuation ratio ΔV0-pk (%) of each of the first gear G1, the second gear G2, and the third gear G3 was examined, the result shown in FIG. 25 was obtained. In FIG. 25, first shaft, second shaft, and third shaft indicate the shafts of the first gear G1, the second gear G2, and the third gear G3, respectively.

According to the figure, it is recognized that the speed fluctuation ratio of the third shaft of the third gear G3 changes with the phase difference between the mesh points.

This attests to the fact that the mesh phase of the gear tooth at each mesh point of a multiple-stage gear train is made the opposite phase or the same phase or the phase is appropriately changed, whereby the phase of the mesh frequency at each mesh point can be adjusted and the speed fluctuation amplitude of the target gear can be easily set in the range of the speed fluctuation amplitude of the immediately preceding mesh gear or less.

SECOND EXAMPLE

As shown in FIG. 26(a), a second example is a driving apparatus having a three-stage gear train including gears G1 (Gear-1) to G3 (Gear-3) meshing with a motor shaft gear 131, wherein the first gear G1 is a two-step gear, the second gear G2 as the center meshes with the first gear G1 at mesh point 1 and the third gear G3 at mesh point 2, and the third gear G3 is driven with deceleration.

In the example, speed fluctuation of mesh frequency is represented as follows:

$$\Delta V(t) = \alpha 1\ Sin(\omega t + \beta 1) + \alpha 2\ Sin(\omega t + \beta 2) + \alpha 3\ Sin(\omega t + \beta 3)$$

where
- α1: Speed fluctuation amplitude of gear G1 (0-pk)
- α2: Speed fluctuation amplitude occurring due to mesh of gears G1 and G2 (0-pk)
- α3: Speed fluctuation amplitude occurring due to mesh of gears G2 and G3 (0-pk)
- β1: Speed fluctuation phase of gear G1
- β2: Speed fluctuation phase occurring due to mesh of gears G1 and G2
- β3: Speed fluctuation phase occurring due to mesh of gears G2 and G3

The speed fluctuation amplitude α and speed fluctuation phase β of each of the gears G1 to G3 and the speed fluctuation amplitude a and speed fluctuation phase β of addition component at mesh 1, 2 were set as shown in FIG. 26(b).

To set the mesh phase, a technique of implementing the gears G1 to G3 as helical gears as shown in FIG. 26(c) and moving the helical gears in the axial direction, thereby changing the face-width of each helical gear for adjusting the mesh phase may be adopted.

Angle between mesh points, θ, is indicated as follows:

θ=n×θp+0.5×θp (n: Integer and θp: One-pitch angle of gear)

Figure 27:
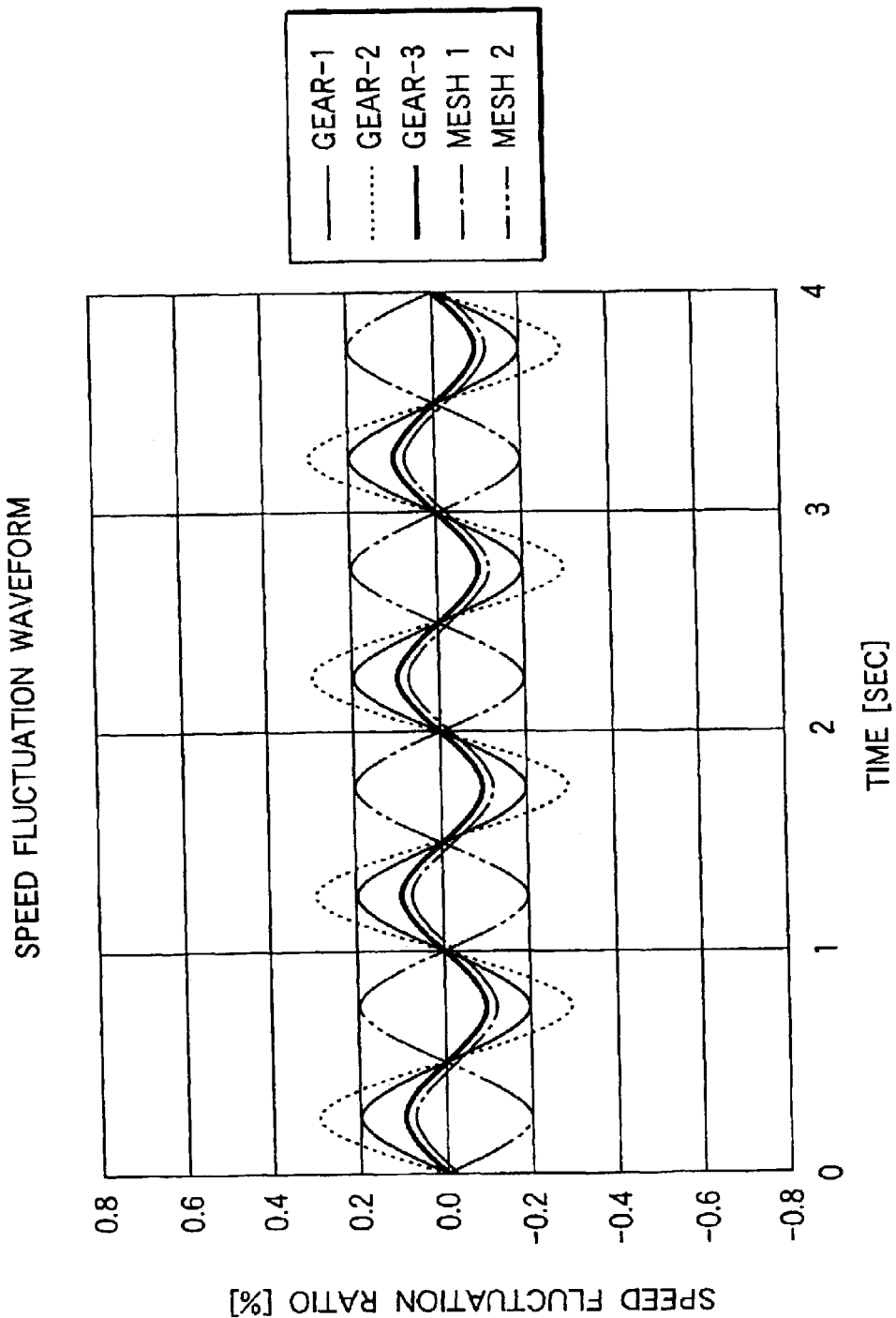
FIG. 27 is a graph to show the speed fluctuation waveforms of the gears G1 to G3 and meshes 1 and 2 in the second example.

FIG. 27 shows the speed fluctuation ratios of the gears G1 to G3 and meshes 1 and 2 in the second example.

Figure 28:
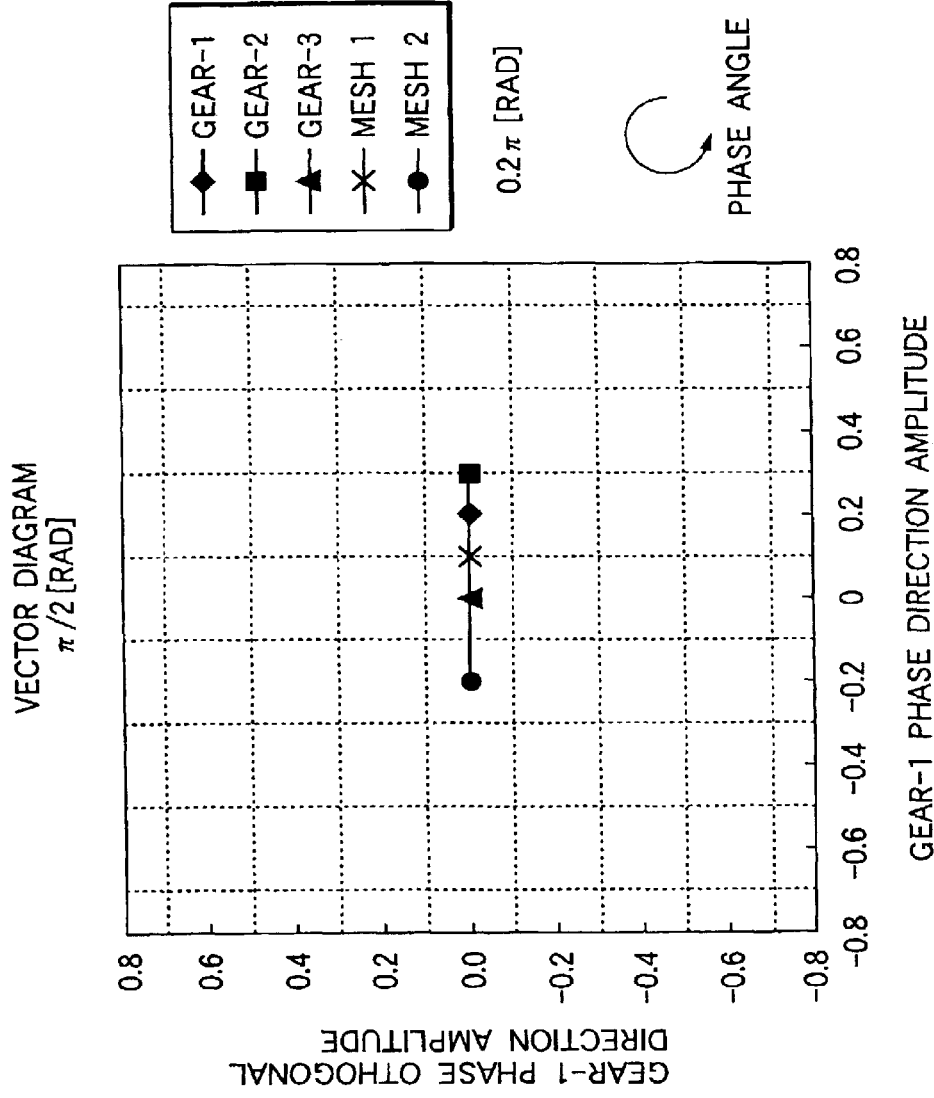
FIG. 28 is a vector diagram to show the relationship between gear G1 phase direction amplitudes and gear G1 phase orthogonal direction amplitudes of the gears G1 to G3 and meshes 1 and 2 in the second example.

FIG. 28 is a vector diagram to show the relationship between gear G1 phase direction amplitudes and phase orthogonal direction amplitudes orthogonal thereto, of the gears G1 to G3 and meshes 1 and 2.

According to the figure, it is understood that the mesh phases become the opposite phases at meshes 1 and 2 and cancel each other out, suppressing the speed fluctuation amplitude of the third gear G3 to a small amplitude.

Figures 29A, 29B:
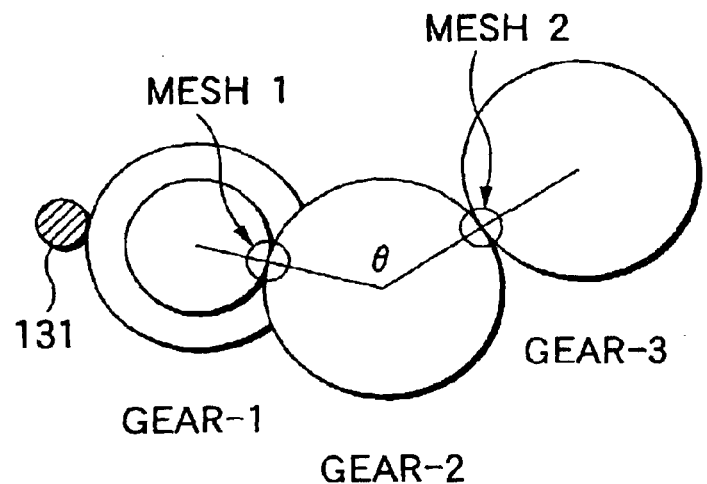
FIG. 29(a) is a schematic representation to show an outline of a driving apparatus according to a comparative example.
FIG. 29(b) is a schematic representation to show amplitude α and phase β of each of gears G1 to G3 and amplitude α and phase β of addition component at mesh 1, 2 in the comparative example.

In contrast, a driving apparatus as shown in FIG. 29(a) is used as a comparative example and speed fluctuation amplitude α and speed fluctuation phase β of each of gears G1 to G3 and speed fluctuation amplitude α and phase β of addition component at mesh 1, 2 were set as in FIG. 29(b).

Angle between mesh points, θ, is

θ=n×θp

Figure 30:
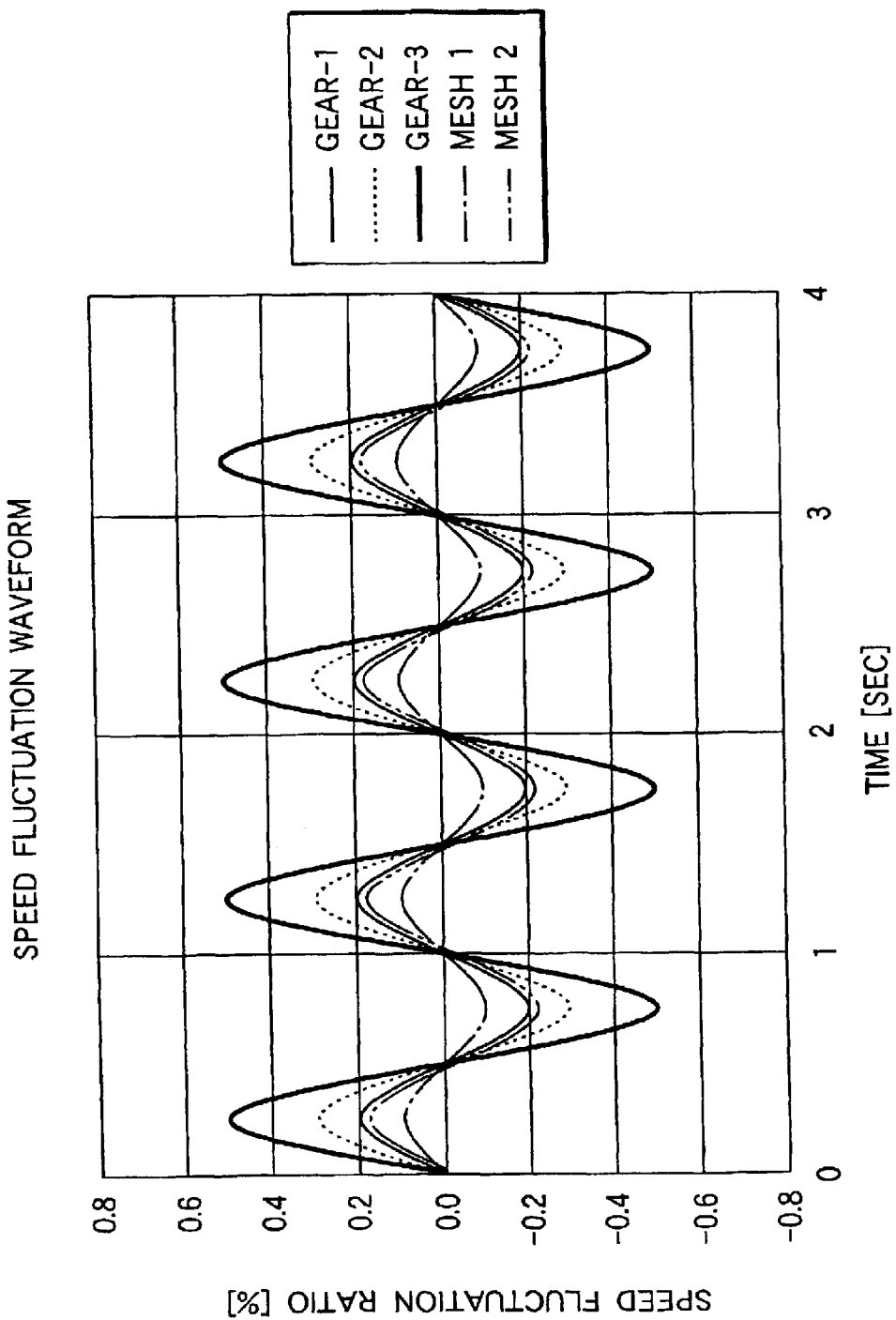
FIG. 30 is a graph to show the speed fluctuation waveforms of the gears G1 to G3 and meshes 1 and 2 in the comparative example.

FIG. 30 shows the speed fluctuation ratios of the gears G1 to G3 and meshes 1 and 2 in the comparative example.

Figure 31:
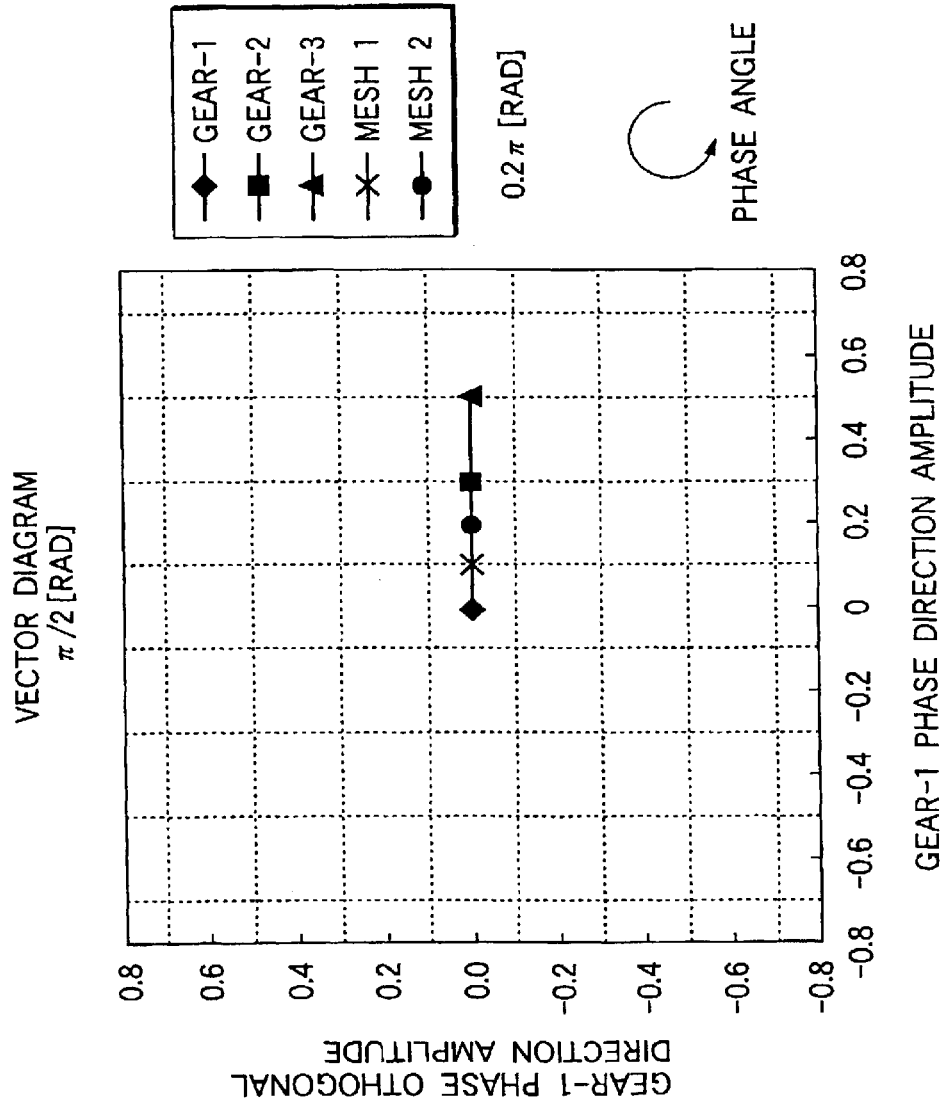
FIG. 31 is a vector diagram to show the relationship between gear G1 phase direction amplitudes and gear G1 phase orthogonal direction amplitudes of the gears G1 to G3 and meshes 1 and 2 in the comparative example.

FIG. 31 is a vector diagram to show the relationship between gear G1 phase direction amplitudes and phase orthogonal direction amplitudes orthogonal thereto, of the gears G1 to G3 and meshes 1 and 2.

According to the figure, it is understood that the mesh phases become the same phases at meshes 1 and 2 and mesh frequencies are superposed on each other, largely amplifying the speed fluctuation amplitude of the third gear G3.

THIRD EXAMPLE

Figures 32A, 32B:
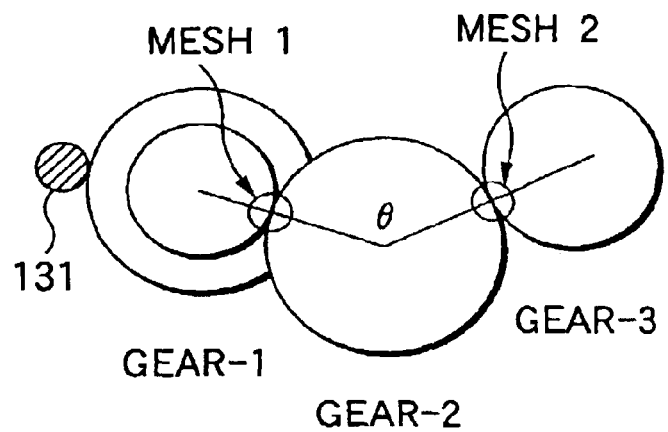
FIG. 32(a) is a schematic representation to show an outline of a driving apparatus according to a third example and FIG. 32(b) is a schematic representation to show amplitude α and phase β of each of gears G1 to G3 and amplitude α and phase β of addition component at mesh 1, 2 in the third example.

As shown in FIG. 32(a), a third example is a driving apparatus having a three-stage gear train including gears G1 (Gear-1) to G3 (Gear-3) meshing with a motor shaft gear 131, wherein the first gear G1 is a two-step gear, the second gear G2 as the center meshes with the first gear G1 at mesh point 1 and the third gear G3 at mesh point 2, and the third gear G3 is driven at increased speed.

The speed fluctuation amplitude α and speed fluctuation phase β of each of the gears G1 to G3 and the speed fluctuation amplitude a and phase β of addition component at mesh 1, 2 were set as in FIG. 32(b).

Angle between mesh points, θ, is represented as follows:

θ=n×θp+0.5×θp

In the example, the speed fluctuation ratios of the gears G1 to G3 and meshes 1 and 2 indicate a similar trend to that in FIG. 25, and the relationship between gear G1 phase direction amplitudes and phase orthogonal direction amplitudes orthogonal thereto, of the gears G1 to G3 and meshes 1 and 2 indicates a similar vector diagram trend to that in FIG. 28.

That is, it is understood that in the speed increasing mode, unlike the same speed or deceleration mode, the relationship between the angle between mesh points and the speed fluctuation phase is inverted.

The angle between mesh points, θ, is similar to that in the comparative example of the second example, but as the phase of the addition component based on mesh 2, the speed fluctuation phase of the gear G1 becomes the opposite phase and as with the second example, the speed fluctuation of the third gear G3 is attenuated.

FOURTH EXAMPLE

In a fourth example, using the driving apparatus according to the fifth embodiment (speed increasing mode), motion quality (MQ) of a model 1 specific gear in which motor shaft gear, IDT2 drive gear, IDT1 drive gear, and photoconductor drum drive gear had a crest/trough/trough mesh transmission technique in mesh phase of motor shaft gear/IDT2 drive gear/IDT1 drive gear/photoconductor drum drive gear and motion quality (MQ) of a model 2 specific gear in which in which motor shaft gear, IDT2 drive gear, IDT1 drive gear, and photoconductor drum drive gear had a crest/trough/crest mesh transmission technique were measured.

FIG. 33(a) shows the speed fluctuation ratios of IDT2 drive gear (in the figure, IDT2)/IDT1 drive gear (in the figure, IDT1)/photoconductor drum drive gear (in the figure, Drum) of the model 1 specification gear. FIG. 33(b) shows the speed fluctuation ratios at mesh 1 (IDT1–IDT2) and mesh 2 (DrumIDT1).

On the other hand, FIG. 34(a) shows the speed fluctuation ratios of IDT2 drive gear (in the figure, IDT2)/IDT1 drive gear (in the figure, IDT1)/photoconductor drum drive gear (in the figure, Drum) of the model 2 specification gear. FIG. 34(b) shows the speed fluctuation ratios at mesh 1 (IDT1–IDT2) and mesh 2 (Drum-IDT1).

According to FIGS. 33(a) and 33(b), it is understood that although the model 1 specification gear adopts the crest/trough/trough mesh transmission technique, the addition components of IDT1 and Drum (mesh 1 (IDT1–IDT2), mesh 2 (Drum-IDT1)) are opposite phases.

On the other hand, according to FIGS. 34(a) and 34(b), it is understood that although the model 2 specification gear adopts the crest/trough/crest mesh transmission technique, the addition components of IDT1 and Drum (mesh 1 (IDT1–IDT2), mesh 2 (Drum-IDT1)) are the same phase.

According to the results, it is assumed that the phases of mesh vibration at the deceleration stage (motor shaft gear (Input)/(IDT2)) and the speed increasing stage (IDT1/Drum) are inverted.

It is estimated that such a phase inversion phenomenon depends on the greater-than, equal-to, less-than relation of the gear tooth slip ratio at the mesh start and end of gear.

Figure 35:
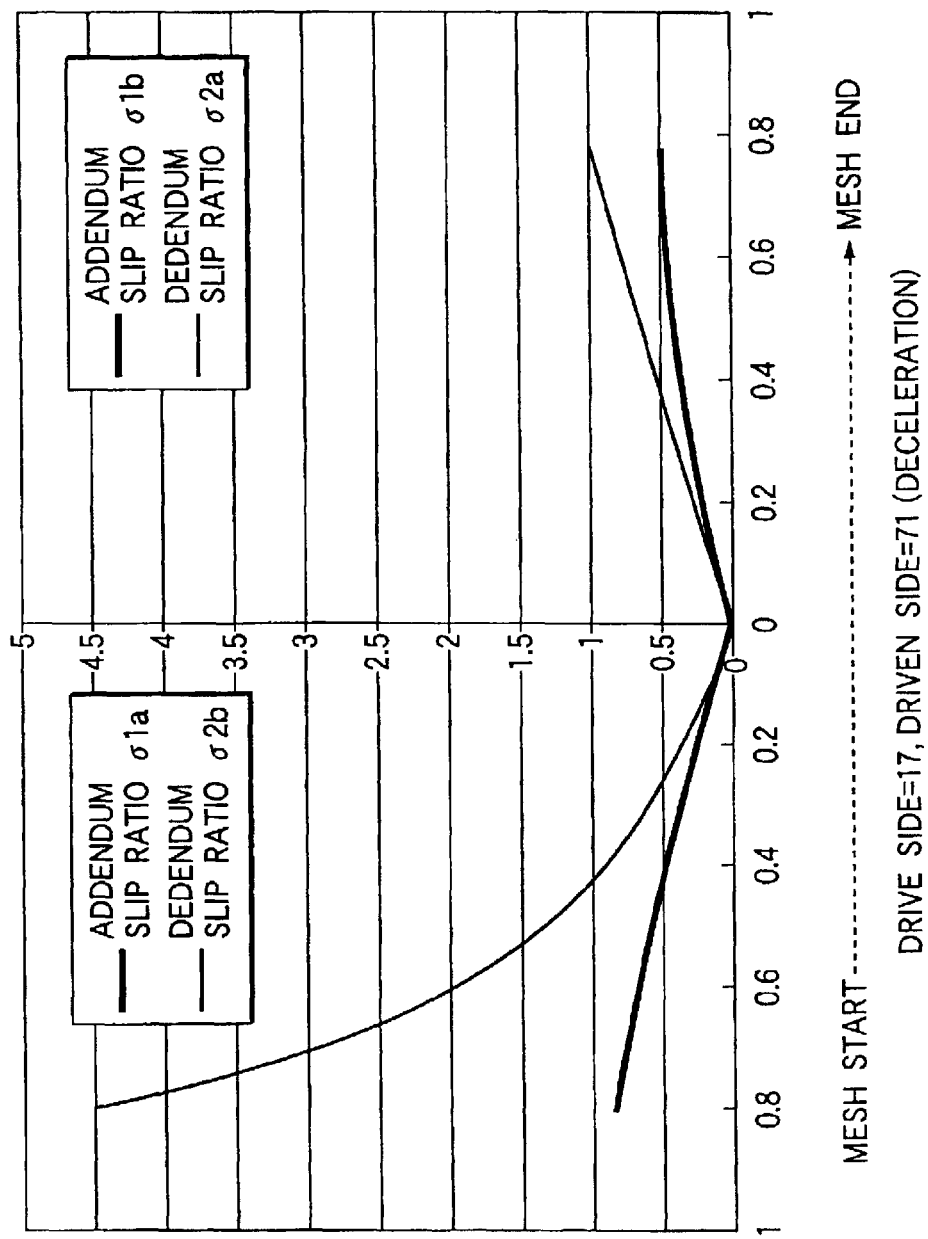
FIG. 35 is a schematic representation to show the mesh behavior of gear tooth in a deceleration mode.
Figure 36:
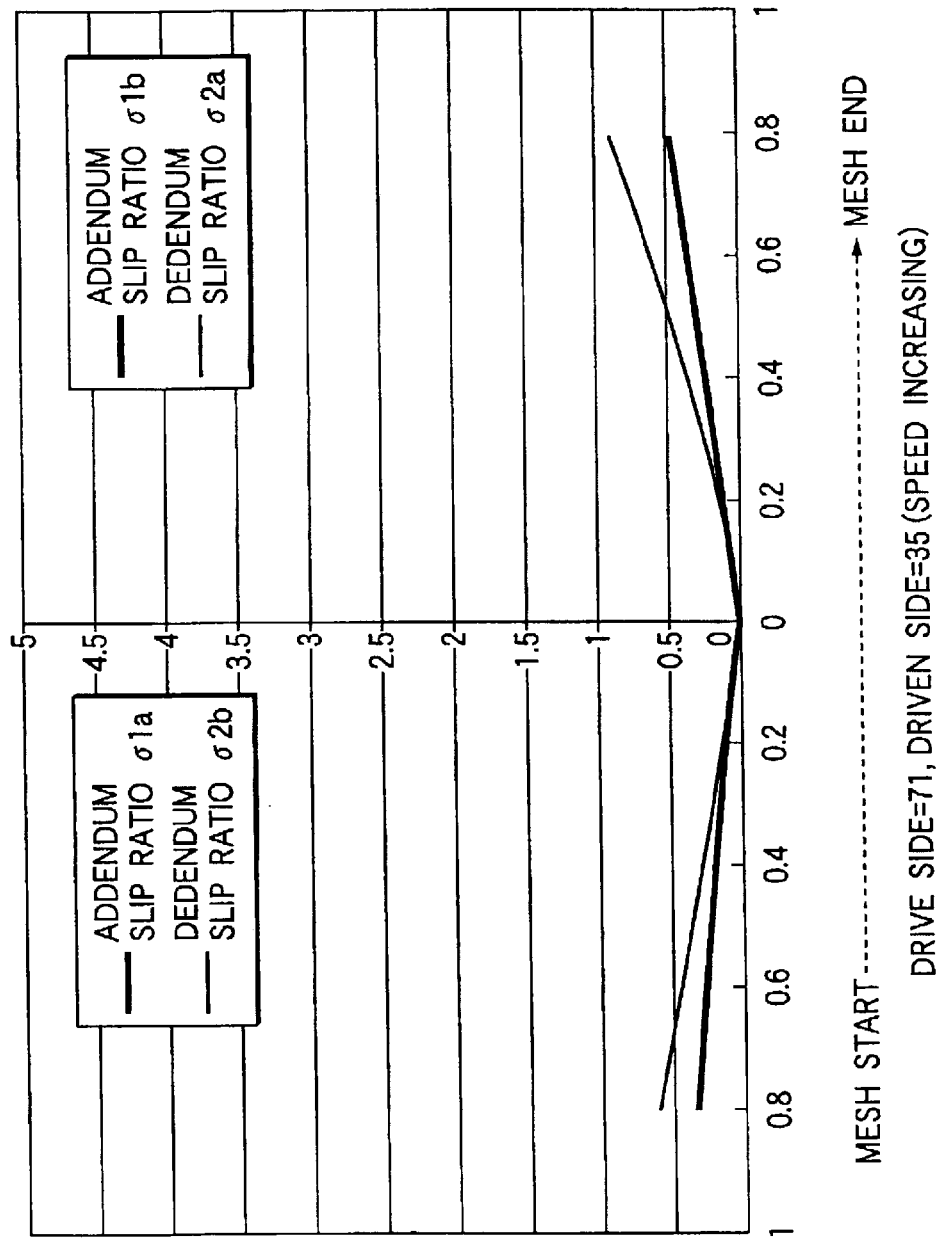
FIG. 36 is a schematic representation to show the mesh behavior of gear tooth in a speed increasing mode.
Figure 37A:
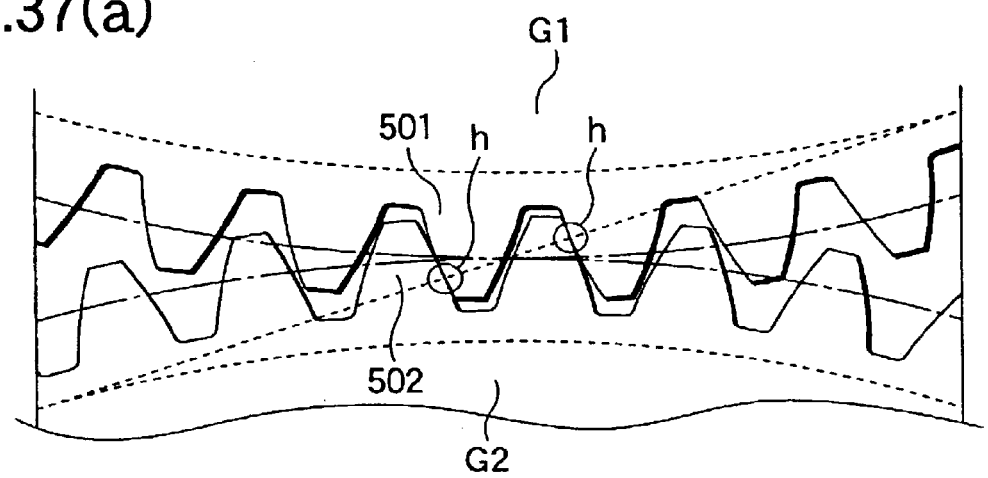
FIGS. 37(a) to 37(c) are schematic representations to show the mesh behavior of gears stepwise.
Figure 37B:
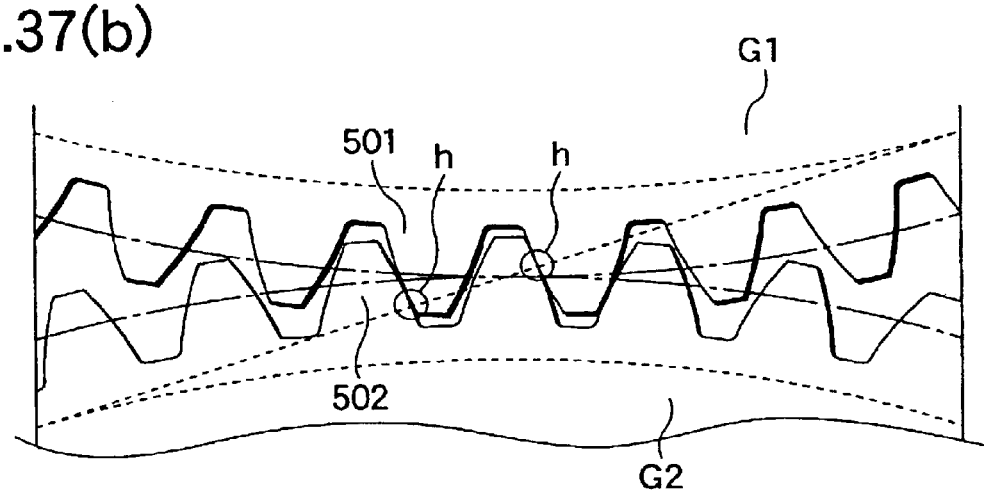
Figure 37C:
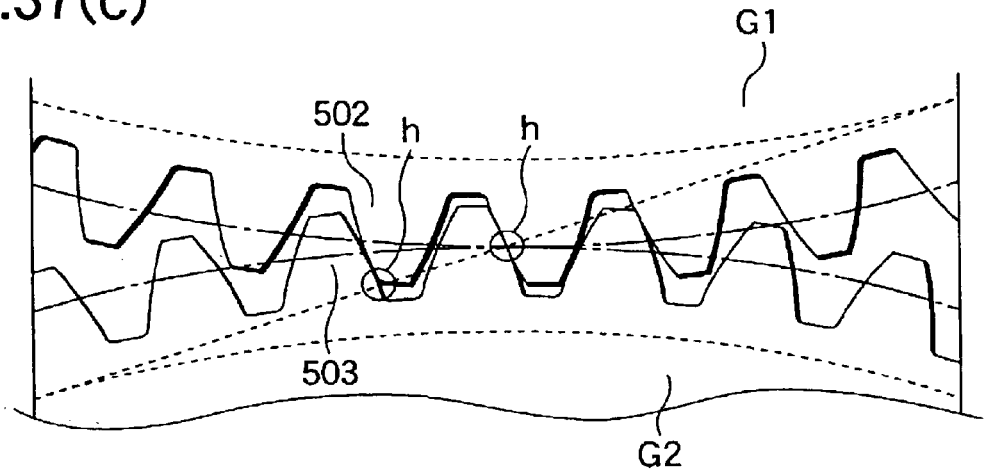
Figure 38A:
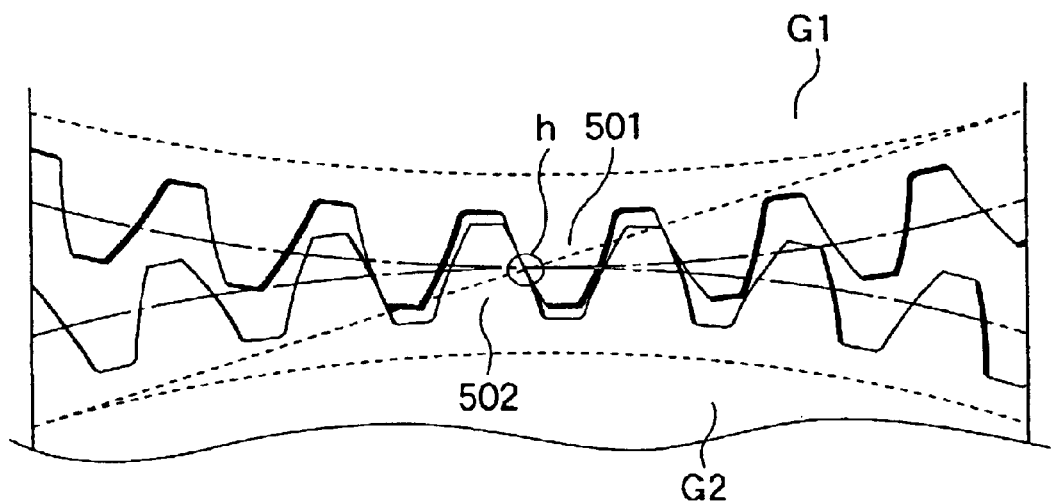
FIGS. 38(a) and 38(b) are schematic representations to show the mesh behavior of gears stepwise.
Figure 38B:
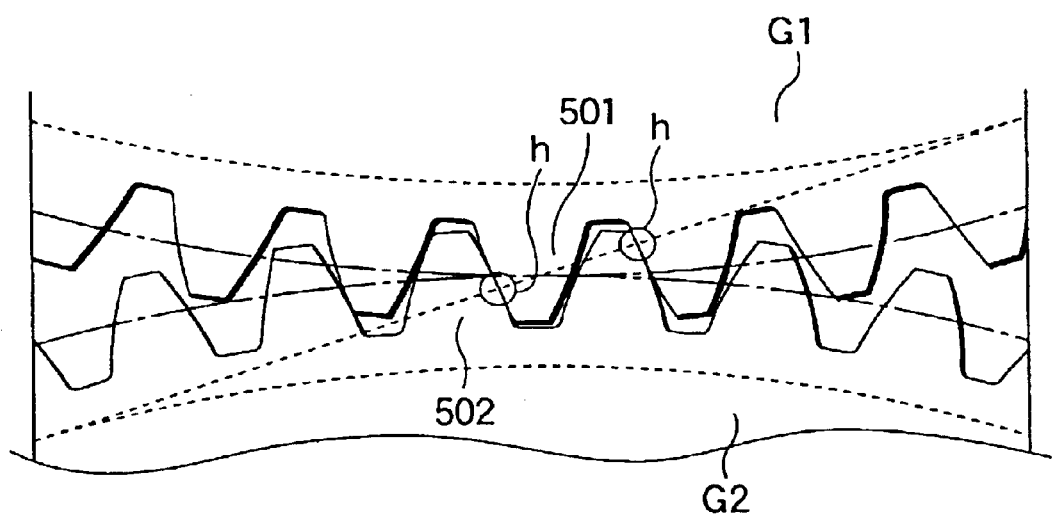
Figure 39:
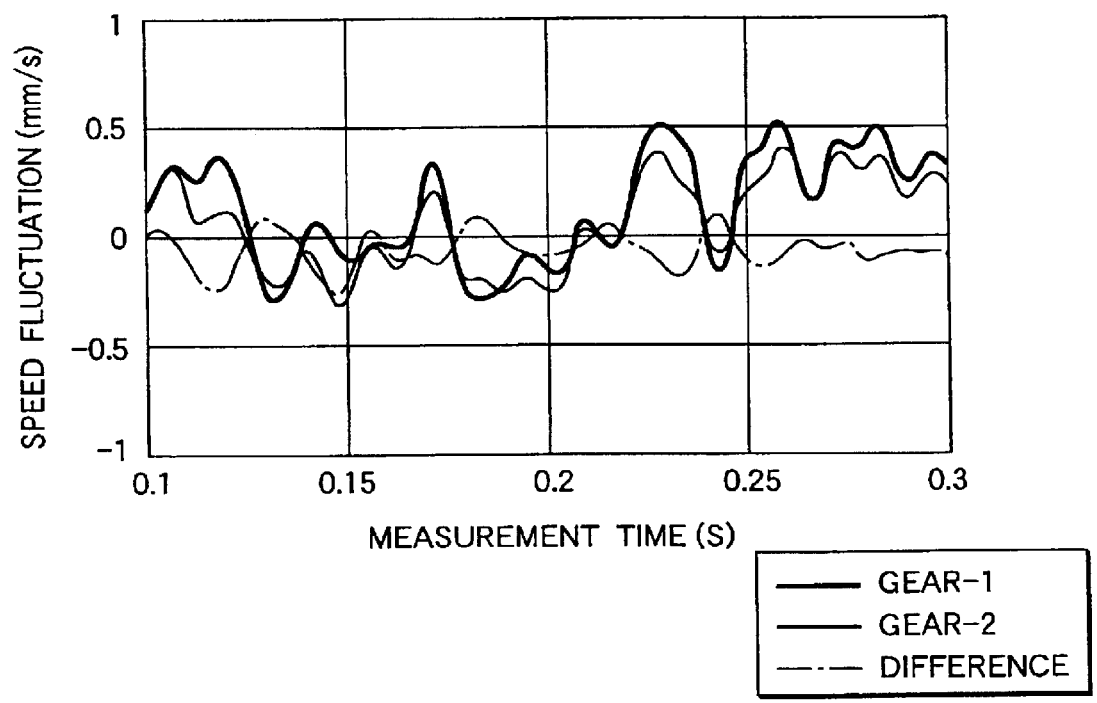
FIG. 39 is a graph to show speed fluctuations of the gears and the difference between the speed fluctuations when a crest crest mesh transmission technique is adopted in a multiple-stage gear train model.
Figure 40:
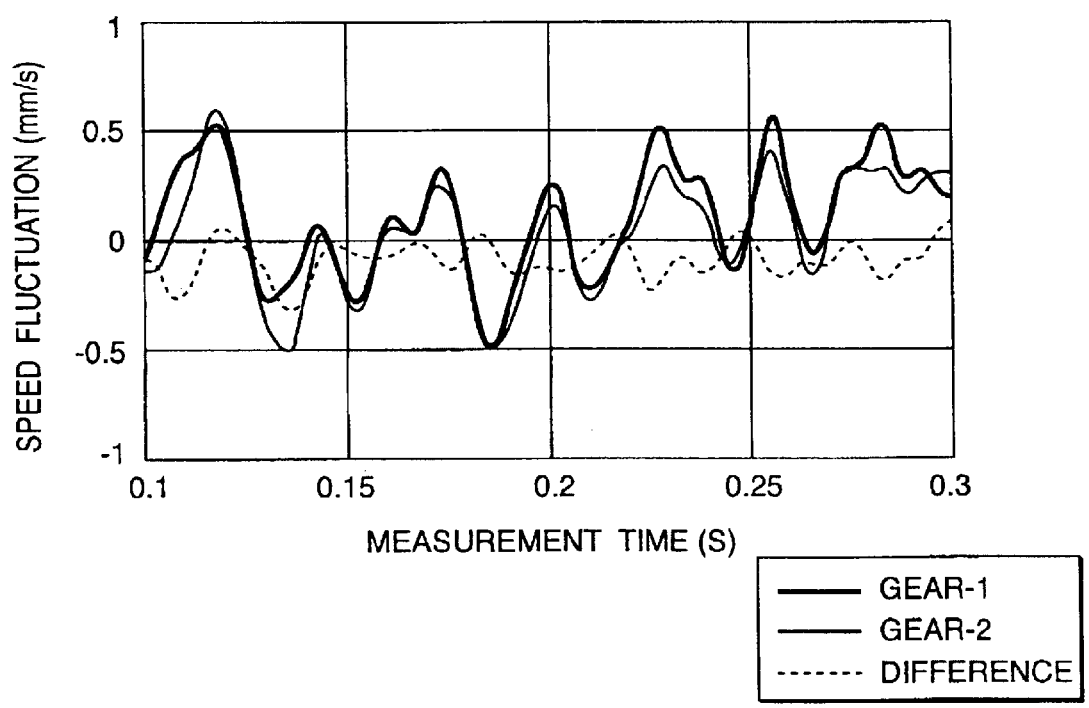
FIG. 40 is a graph to show speed fluctuations of the gears and the difference between the speed fluctuations when a crest trough mesh transmission technique is adopted in the multiple-stage gear train model.
Figure 41:
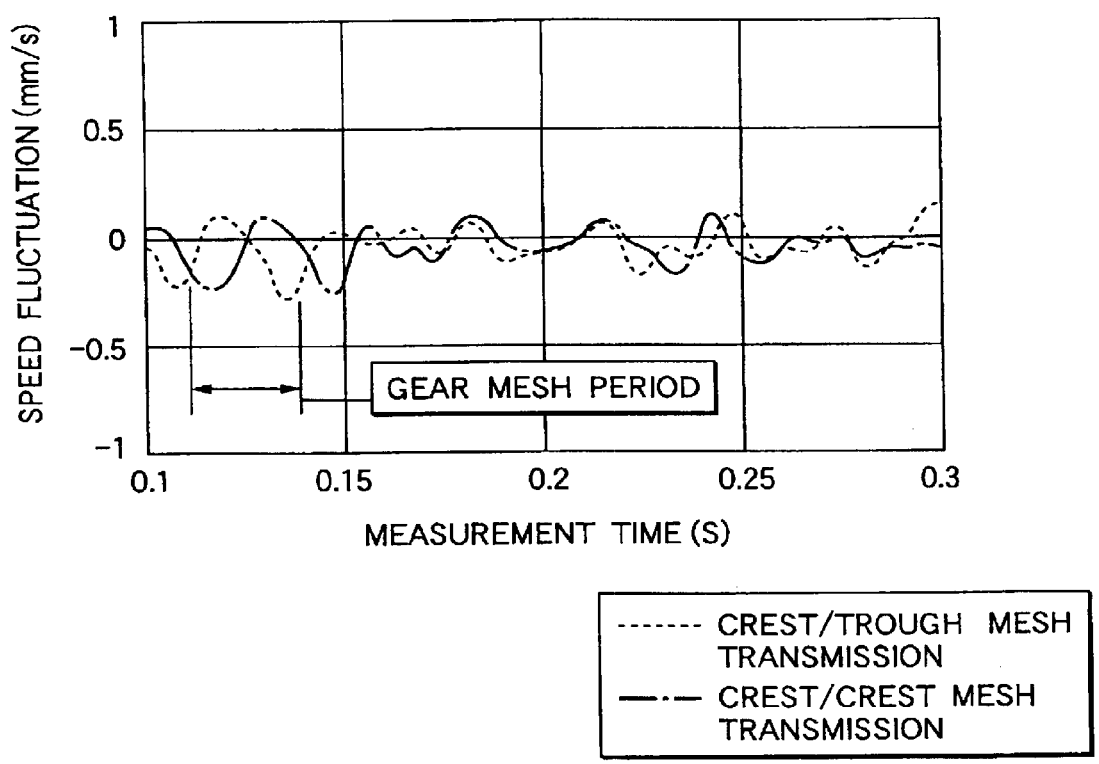
FIG. 41 is a schematic representation to show the speed fluctuation differences of the gears in the crest crest mesh transmission technique and the crest trough mesh transmission technique in the multiple-stage gear train model.

That is, when the gear tooth slip ratios (in the example, evaluated in terms of addendum slip ratio and dedendum slip ratio of gear tooth) were examined between the mesh start and end in the deceleration mode (deceleration stage), it is recognized that the dedendum slip ratio is very large at the mesh start, as shown in FIG. 35.

On the other hand, likewise, when the gear tooth slip ratios (in the example, evaluated in terms of addendum slip ratio and dedendum slip ratio of gear tooth) were examined between the mesh start and end in the speed increasing mode (speed increasing stage), it is understood that the addendum slip ratio and the dedendum slip ratio are small as a whole between the mesh start and end, as shown in FIG. 35.

Therefore, in the example, the model 1 specification gear may be adopted or in the model 2 specification gear, the speed fluctuation phase of the IDT2 drive gear may be set to the opposite phase to that of the addition component composite wave of the IDT1 drive gear and the photoconductor drum drive gear for drastically attenuating the motion quality (MQ) of the photoconductor drum.

As described above, according to the invention, in the drive using the multiple-stage gear train, the speed fluctuation phase of the mesh frequency occurring at each mesh point of the gear train to the target gear is set in the range in which the speed fluctuation amplitude of the target gear is equal to or less than the speed fluctuation amplitude of the immediately preceding mesh gear positioned upstream, so that the speed components caused by the mesh components of the multiple-stage gear train can be suppressed without adopting a flywheel technique, etc.

Thus, the speed fluctuation caused by the mesh components of the multiple-stage gear train can be prevented effectively without upsizing the driving apparatus itself.

According to the image formation apparatus using the driving apparatus, the speed fluctuation caused by the mesh components of the multiple-stage gear train can be prevented effectively without upsizing the driving apparatus (apparatus) itself. Thus, if the driving apparatus is applied, for example, to a tandem image formation apparatus, the drive performance of a driven body such as an image support by the driving apparatus with less speed fluctuation can be stabilized while the demand for miniaturization of the driving apparatus (apparatus) is satisfied.

What is claimed is:

1. A driving apparatus for transmitting a driving force from a drive source to a driven body via a multiple-stage gear train, the driving apparatus comprising:
    at least three gears meshing with each other to form the gear train, the gears including a first gear disposed at upstream most of the gear train, a target gear disposed at third stage or later in the gear train, and a gear immediately preceeding the target gear,
    wherein speed fluctuation phase of a mesh frequency occurring at each mesh point in the gear train between the first gear and the target gear is set so that speed fluctuation amplitude of the target gear is not more than that of the gear immediately preceding the target gear.

2. The driving apparatus according to claim 1,
    wherein the speed fluctuation phase of the mesh frequency occurring at each mesh point in the gear train between the first gear and the target gear is set so that the speed fluctuation amplitude of the target gear becomes minimum.

3. The driving according to claim 1,
    wherein the target gear is driven at the same speed or with deceleration relative to the gears in the upstream.

4. The driving apparatus according to claim 3,
    wherein in a three-stage gear train including the target gear and the immediately preceding two-stage gear train in the upstream thereof, phases of gear teeth at an output side mesh point of the intermediate gear and at an input side mesh point of the intermediate gear are shifted to approximately opposite phases.

5. The driving apparatus according to claim 3,
    wherein in a gear train including the target gear and at the preceding gear train including at least two gears in the upstream thereof, phases of gear teeth at mesh points are shifted in response to a shift angle provided by dividing 360 degrees by number of mesh points.

6. The driving apparatus according to claim 1,
    wherein the target gear is driven at increased speed relative to the gears in the upstream.

7. The driving apparatus according to claim 4,
    wherein in a three-stage gear train including the target gear and the preceding two-stage gear train in the upstream thereof, phases of gear teeth at an output side mesh point of the intermediate gear and an input side mesh point of the intermediate gear are set approximately to the same phases.

8. The driving apparatus according to claim 1,
    wherein at least one of the gears except for the target gear is a multiple-step gear.

9. The driving apparatus according to claim 1,
    wherein the speed fluctuation phase of the mesh frequency occurring at each mesh point in the gear train between the first gear and the target gear is set in response to one-pitch angle of each gear and positional relation among the mesh points.

10. The driving apparatus according to claim 1,
    wherein all or a part of the gears, which includes the target gear, are helical gears; and
    wherein at a mesh point where the helical gear meshes, the speed fluctuation phase of the mesh frequency occurring at each mesh point in the gear train between the first gear and the target gear is set based on axial mesh width of the helical gear.

11. The driving apparatus according to claim 10,
    wherein face-width of an intermediate helical gear at an intermediate position in the gear train is set smaller than that of preceding helical gears in the upstream and downstream thereof so that the intermediate helical gear meshes with the preceding helical gears in the upstream and downstream thereof in all area of the face-width of the intermediate helical gear.

12. The driving apparatus according to claim 1,
    wherein all or a part of the gears, which includes the target gear, are helical gears; and
    wherein the helical gear positioned at an end of the gear train is a phase adjustment gear movable in an axial direction.

13. The driving apparatus according to claim 1,
    wherein all or a part of the gears, which includes the target gear, are helical gears; and
    wherein a position regulation member for regulating an axial position of the helical gear is provided.

14. The driving apparatus according to claim 1,
    wherein the target gear is a plurality of target gears.

15. The driving apparatus according to claim 1,
    wherein the speed fluctuation phase of the mesh frequency is set centering around a fundamental component.

16. The driving apparatus according to claim 1,
    wherein the speed fluctuation phase of the mesh frequency is set centering around a harmonic component.

17. The driving apparatus according to claim 1, wherein a phase of a tooth at the mesh point on an input side of the gear immediately preceding the target gear is opposite to that of a tooth at the mesh point on an output side of the gear immediately preceding the target gear.

18. An image formation apparatus comprising:
    a driving apparatus for driving a driven body,
    wherein the driving apparatus transmits a driving force from a drive source to the driven body via a multiple-stage gear train;
    wherein the driving apparatus includes at least three gears meshing with each other to form the gear train, the gears including a first gear disposed at upstream most of the gear train, a target gear disposed at third stage or later in the gear train, and a gear immediately preceeding the target gear; and wherein speed fluctuation phase of a mesh frequency occurring at each mesh point in the gear train between the first gear and the target gear is set so that speed fluctuation amplitude of the target gear is not more than that of the gear immediately preceding the target gear.

19. The image formation apparatus according to claim 18, further comprising:
   an image formation support for forming and supporting an image; and
   an intermediate transfer body for temporarily supporting the image on the image formation support, transporting the image, and transferring the image onto a record material, wherein the driving apparatus transmits the driving force from the drive source to the intermediate transfer body and the image formation support in order.

20. A driving apparatus for transmitting a driving force comprising:

a drive source; and a driven body, wherein the sum of a tooth phase at a mesh point on an input side of the driving force and a tooth phase at a mesh point on an output side of the driving force is an integral multiple of $2\pi$.

* * * * *